United States Patent
Smith

(10) Patent No.: US 7,467,078 B2
(45) Date of Patent: Dec. 16, 2008

(54) PORTABLE DISTRIBUTED APPLICATION FRAMEWORK

(75) Inventor: Geoff Smith, Burwood (AU)

(73) Assignee: Agilent Technologies Inc., Santa Clara, CA (US)

( * ) Notice: Subject to any disclaimer, the term of this patent is extended or adjusted under 35 U.S.C. 154(b) by 775 days.

(21) Appl. No.: 10/893,668

(22) Filed: Jul. 16, 2004

(65) Prior Publication Data

US 2006/0013252 A1  Jan. 19, 2006

(51) Int. Cl.
G06F 9/455 (2006.01)
(52) U.S. Cl. .................. 703/25; 703/27; 703/23; 703/25; 703/21; 370/338; 370/470; 370/431; 370/219; 370/466; 709/245; 709/217; 709/227; 709/224; 709/223
(58) Field of Classification Search ................ 455/41.2; 370/338, 470, 219, 431; 703/26, 27, 23; 709/227; 714/43
See application file for complete search history.

(56) References Cited

U.S. PATENT DOCUMENTS

| | | | |
|---|---|---|---|
| 5,371,736 A * | 12/1994 | Evan | 370/470 |
| 5,448,566 A * | 9/1995 | Richter et al. | 370/431 |
| 5,473,599 A * | 12/1995 | Li et al. | 370/219 |
| 5,774,695 A * | 6/1998 | Autrey et al. | 703/26 |
| 5,790,804 A * | 8/1998 | Osborne | 709/245 |
| 5,857,074 A * | 1/1999 | Johnson | 709/217 |
| 5,946,311 A | 8/1999 | Alexander, Jr. | |
| 6,178,450 B1 | 1/2001 | Ogishi | |
| 6,317,438 B1 * | 11/2001 | Trebes, Jr. | 370/466 |
| 6,788,688 B2 * | 9/2004 | Trebes, Jr. | 370/395.1 |
| 6,996,085 B2 * | 2/2006 | Travostino et al. | 370/338 |
| 7,209,874 B2 * | 4/2007 | Salmonsen | 703/23 |
| 2002/0080754 A1 * | 6/2002 | Travostino et al. | 370/338 |
| 2002/0081971 A1 * | 6/2002 | Travostino | 455/41 |
| 2002/0093980 A1 * | 7/2002 | Trebes, Jr. | 370/466 |
| 2002/0156885 A1 * | 10/2002 | Thakkar | 709/224 |
| 2002/0156886 A1 * | 10/2002 | Krieski et al. | 709/224 |
| 2002/0157041 A1 * | 10/2002 | Bennett et al. | 714/43 |
| 2002/0186697 A1 * | 12/2002 | Thakkar | 370/401 |
| 2003/0051070 A1 | 3/2003 | Shappir et al. | |
| 2004/0024580 A1 * | 2/2004 | Salmonsen et al. | 703/27 |
| 2005/0027870 A1 * | 2/2005 | Trebes, Jr. | 709/227 |

FOREIGN PATENT DOCUMENTS

WO  9914891 A2  3/1999

OTHER PUBLICATIONS

X. W. Huang, R. Sharma, S. Keshav☐☐The Entrapid Protocol Development Environment☐☐0-7803-5417-6/99 IEEE, 1999, pp. 1107-1115.*

* cited by examiner

Primary Examiner—Kamini Shah
Assistant Examiner—Cuong V Luu
(74) Attorney, Agent, or Firm—Marc Bobys

(57) ABSTRACT

A portable distributed application framework that uses a definition file describing a structure of data and commands to be used by the framework to interface with an application. A proxy, responsive to a definition file, creates and receives messages based on the definition file. The created messages contain data and commands used to control the application while the received messages contain data from the application. A control, responsive to the definition file, relays messages between the proxy and the application. A housing, responsive to the definition file and the messages from the proxy, provides the application with configuration information and receives data from the application.

11 Claims, 7 Drawing Sheets

PORTABLE DISTRIBUTED APPLICATION FRAMEWORK

BACKGROUND OF THE INVENTION

Network devices, such as routers, are extensively tested to ensure that erroneous transmissions and fatal errors are minimized. A variety of test devices are available on the marketplace, including the ROUTER TESTER from AGILENT TECHNOLOGIES, assignee of the present application. Such test devices typically monitor the router's response to a variety of simulated input.

The process of routing can be quickly summarized as a node finding the path to every possible destination. Routing is present in everything from layer 1 (the physical layer) on up. The routing that most people are familiar with, however, occurs at layer 3 (the network layer) and as such, only layer 3 (and more specifically) Internet Protocol (IP) routing will be referenced herein. Routers use tables to determine where to forward packets. Updating these tables is a function performed by routing protocols. Each router is responsive to one or more protocols.

Protocols for exchanging routing information connect multiple routers around the world to provide them with a common view of the network through their heterogeneous, though generally consistent routing tables. Routing tables store all information necessary for the router to reach every destination on the network irrespective of size. There are a wide variety of routing protocols used to contribute to the routing tables across a network. Protocols such as BGP, OSPF, RIP and ISIS help to convey a correct and coherent picture of the network to all routers on the network.

Known router tester simulate network traffic using specifically created "test packets" of data that are typical of the live data present on the network. These test packets are transmitted to the network device over a network under test. Parameters tested by traffic simulator systems (including ROUTER TESTER) include routing verification, achievement of Quality of Service (QoS) levels under load, and correct interworking with other devices. Many of these so-called "packet blasters" also test the ability of the network device to adhere to protocols by formulating and transmitting data in accordance with the protocols.

FIG. 1 is a block diagram of a traffic simulator test system 100. More particularly, the traffic simulator test system 100 is a general representation of ROUTER TESTER, offered by AGILENT TECHNOLOGIES. ROUTER TESTER is but one example of a router test system and in particular is advertised as a multi-port traffic generation, protocol emulation, and analysis test system for verifying the performance of enterprise, metro/edge, core routing and optical networking devices. The system generally comprises a plurality of protocol emulation cards $102n$ connected to a system under test, in this case a router 104. Each of the protocol emulation cards $102n$ generally comprises a processor with associated memory and I/O. The protocol emulation cards $102n$ are controlled by a computer 106, such as a PC running a WINDOWS environment. The computer 106 is responsive to an interface 108, such as a graphical user interface.

The test packets produced by the protocol emulation cards $102n$ are built according to the rules and interpretations of communications protocols, such as those defined by the many standards bodies in the industry. There are many communications protocols in use and new protocols continue to be developed. Typically, new protocols are initially developed by equipment manufacturers and are proprietary in nature. Often, the protocols are subsequently adopted by standards bodies for widespread implementation in industry. The protocol emulation cards $102n$ use protocol state machines to create data for transmission in accordance with the subject protocol. The state machines are similar in operation to the state machines used in the routers themselves.

The current software architecture associated with traffic simulator test systems requires hard-coding all parts of the protocol emulation solution including the graphical user interface, scripting API, configuration and control components, along with the protocol state machine itself. The hard coding required for each protocol has resulted in the use of an enormous amount of human talent to create the large body of code. Much of this code is dedicated to interfacing the computer 106 with each new protocol emulation card $102n$.

The traditional approach to interfacing the computer 106 with each new protocol emulation card $102n$ requires methods and associated parameters to be known at the time the interface is written and hard coded in an interface description language (IDL). Under this paradigm, new methods and parameters are continually being created each time new protocol emulations are written or old protocols are extended. This has resulted in a vast API (application programming interface) containing many hundreds of methods and parameters, resulting in a body of code that is expensive to maintain. Further, the known approaches result in the API being replicated at several different layers, thereby compounding the problems. Thus, each change to the API (no matter how small) requires the updating of a significant amount of code and different levels within the system. One side effect of this approach is that a unique GUI (graphical user interface) must be generated for each protocol and each update thereof. As with the API, as the number of protocols grow, so do the required GUI implementations.

Efforts are now being made to design generic systems that alleviate some of the foregoing problems. One example is described in co-pending U.S. patent application Ser. No.: 10/266,507, Publication No.: U.S. 20040068681 A1, entitled: Building packets of data. U.S. 20040068681 A1, incorporated herein by reference, uses an external protocol emulation description to drive a generic protocol data unit (PDU) encode/decode engine. A next step is to build a generic interface to the protocol emulators that do not require new code or hard coded interfaces changes for each new emulator or change thereto.

On approach to this situation is to develop a proprietary compiled language for controlling protocols. Language statements are written and compiled on the host computer and the resulting object files are distributed to the embedded software modules for execution. Under this approach, new language statements are needed for each protocol developed. This requires continual reworking of the compiler, which by its nature is a complex, highly skilled task. Further, GUI development remains a large ongoing task for each protocol.

Another approach is to develop a conventional, non-generic, application framework. This approach requires protocol emulations to be built within fixed, pre-defined APIs and data structures, or the framework be heavily customized for each protocol. Experience with real-world protocols suggests that heavy customization is necessary, making this approach unsatisfactory.

Accordingly, the present inventors have recognized a need for a generic framework that interfaces with applications based on definition files external to framework. To adapt the framework for a different application would only require the creation of a new definition file as opposed to the reworking of the framework itself. In the context of a protocol state machine, such a framework would enable the use of a plurality of user interfaces, including a generic GUI, capable of supporting all protocol emulations; a generic control and command host component; and a generic protocol housing on the embedded device.

BRIEF DESCRIPTION OF THE DRAWINGS

An understanding of the present invention can be gained from the following detailed description of certain embodiments of the present invention, taken in conjunction with the accompanying drawings of which.

Figure 1:
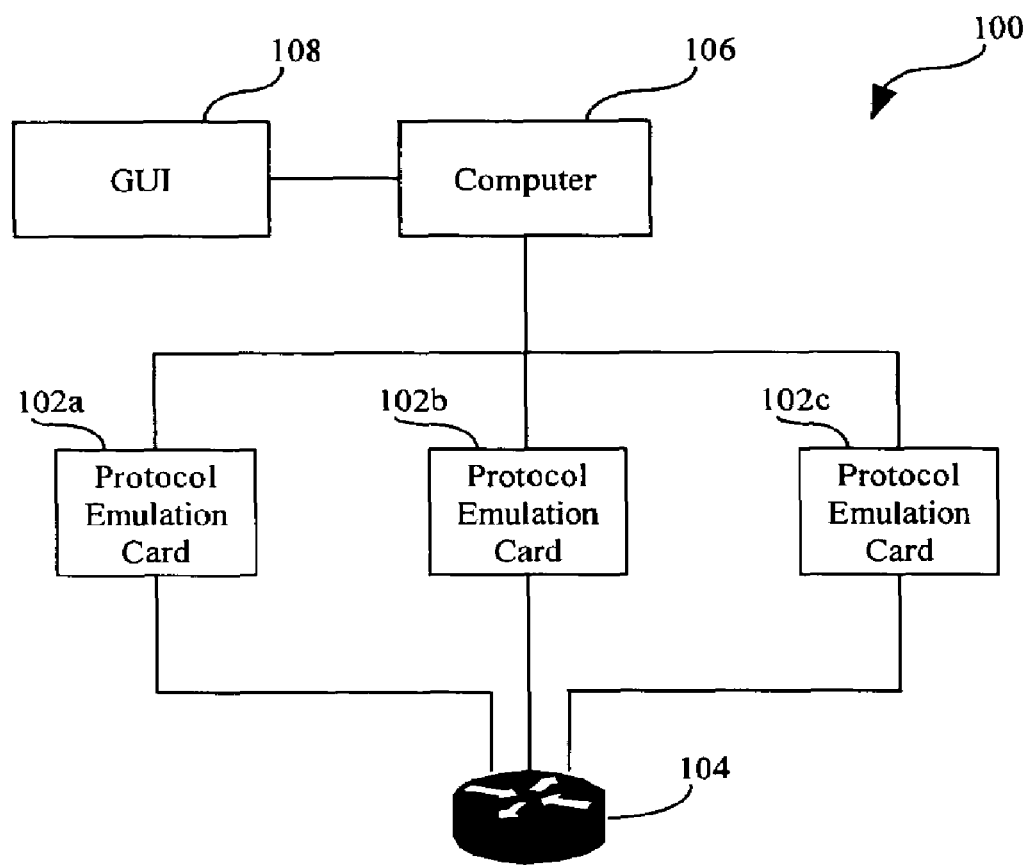
FIG. 1 is a block diagram of a traffic simulator test system.

In the description contained hereinafter, the use of a lowercase "n" adjacent to an element identifier denotes a non-specific instance of an element within a group of elements rather than a specific element as shown in the figures or discussed in the specification with a non-italicized letter adjacent to the element number. In the case of a group of elements sharing a common element identifier, the use of such element identifier without an adjacent letter refers to the group of elements as a whole.

DETAILED DESCRIPTION

Reference will now be made to embodiments of the present invention, examples of which are illustrated in the accompanying drawings, wherein like reference numerals refer to like elements throughout. The detailed description which follows presents methods that may be embodied by routines and symbolic representations of operations of data bits within a computer readable medium, associated processors, data generation and acquisition cards, and the like. A routine is here, and generally, conceived to be a sequence of steps or actions leading to a desired result, and as such, encompasses such terms of art as "program," "objects," "functions," "subroutines," and "procedures." These descriptions and representations are the means used by those skilled in the art effectively convey the substance of their work to others skilled in the art. For the sake of convenience, the word "network" will hereinafter in the description and claims be used to refer to any one or more of: a communication network, a network device, any other communication device, and any aspect or aspects of a communication system which can be tested using test packets of data.

Embodiments which comprise methods are described with respect to implementation on a router tester having a configuration similar to the AGILENT ROUTER TESTER. However, the methods recited herein may operate on any of a variety of router testers. More to the point, the methods presented herein are not inherently related to any particular device; rather, various devices may be used with routines in accordance with the teachings herein. In particular the methods described herein for transfer of data from one device to another, while being described with respect to router tester function, may be applicable to the data communication field in general. Machines that may perform the functions described herein include those manufactured by such companies as AGILENT TECHNOLOGIES, INC., HEWLETT PACKARD, and TEKTRONIX, INC. as well as other manufacturers of communication equipment.

With respect to the software described herein, those of ordinary skill in the art will recognize that there exist a variety of platforms and languages for creating software for performing the procedures outlined herein. Embodiments of the present invention can be implemented using any of a number of varieties of C, including $C^{++}$. However, those of ordinary skill in the art also recognize that the choice of the exact platform and language is often dictated by the specifics of the actual system constructed, such that what may work for one type of system may not be efficient on another system. It should also be understood that the routines and calculations described herein are not limited to being executed as software on a computer, but can also be implemented in a hardware processor. For example, the routines and calculations could be implemented with HDL (Hardware Design Language) in an ASICS or in an FGPA using a variety of design tools.

Overview

The present invention is directed toward a portable distributed application framework that may be easily adapted to interface with and control a variety of applications. In general, the framework comprises a housing that interfaces with an application, a proxy that interfaces with one or more client interface mechanisms (such as a GUI), and a control that facilitates communication between the proxy and the housing. Each of the housing, proxy and control are configured using the same (or perhaps a copy thereof) description file. The description file contains descriptions of data structures and commands used by the framework to interface with and control the application. The following description will focus on describing the present invention as implement for use in interfacing with and controlling sessions of protocol emulation software. However, the present invention is not limited in use to protocol emulation software but may be suited for use in a variety of environments, especially where management of remote applications is desirable.

Figures 2A, 2B:
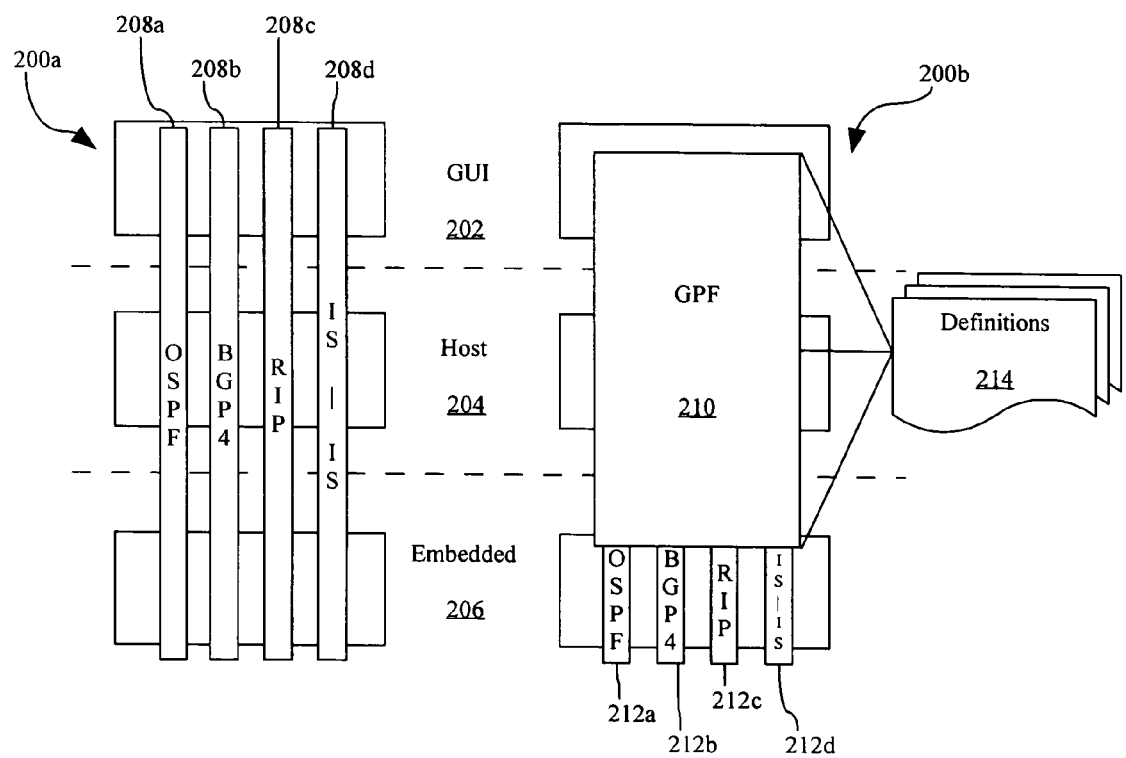
FIG. 2a is a block diagram useful for explaining a known protocol emulation software architecture.
FIG. 2b is a block diagram useful for explaining an architecture suitable for controlling protocol emulation software in accordance with embodiments of the present invention.

FIG. 2a is a block diagram useful for explaining a known protocol emulation software architecture 200a. Protocol emulation software generally interacts with three distinct functional areas: a graphical user interface (GUI) 202 to provide a control mechanism, an operating system (OS) 204 to provide a command component; and embedded software 206 which forms a protocol housing on the card 102 (for example). In known systems, protocol emulation software 208n contains a complex suite of code that is custom written for a particular protocol, e.g. OSPF (208a); BGP4 (208b); RIP (208c) and IS-IS (208d). In other words, for each emulation 208n, custom interfaces to the GUI 202; the OS 204; and the embedded software 206 must be created and integrated.

FIG. 2b is a block diagram useful for explaining a protocol emulation software architecture 200b in accordance with embodiments of the present invention. Embodiments of the present invention generally comprise a suite of software routines 210, referred to herein as the generic protocol framework 210 (or GPF 210). The GPF 210 interfaces with the GUI 202, the OS 204, and the embedded software 206. The GPF 210 embodies a generic GUI capable of supporting all protocol emulations, a generic control and command host component, and a generic protocol housing on the embedded device. Depending on the particular implementation, it may prove beneficial to custom code certain elements of the protocol, depicted as elements 212$n$ in FIG. 2$b$, for example the protocol state machine. In such an implementation, the framework 210 generalizes the services supporting protocol emulators, and the control layer residing above the protocol state machine. However, it is possible, as described herein after, to create a complete protocol emulation using just the framework 210 without the need for embedded custom coded components, such as elements 212$n$.

As used herein the term "generic" is used in the sense that each generic component is written without knowledge of specific protocol emulations. One method to accomplish this goal is to define commands and data structures external of the components in a protocol emulation definition file(s) 214. In perhaps the preferred embodiment, the protocol emulation definition files 214 describe: the hardware pattern matchers needed to select emulation packets from the incoming data stream; details of the TCP/IP sockets used by the emulation, including socket parameters and socket options; a set of generic data-structures used to describe the commands, configuration and results data used by the emulation; and formatting information needed by the GUI to present emulation data to the user. The protocol definition files 214 may be used to create data structures that are used during run time to configure the GPF 210 to interact with a particular protocol.

In one embodiment, the protocol emulation definition files 214 use XML tags to organize services and control data. For example, the configuration of the hardware pattern match filters may be described using an XML <filter> tag. Similarly, the specification of the TCP/IP sockets required for the emulation may be made using a <socket> tag. The commands and data structures communicated to and from emulations may be described using a <parcel> tag. Finally, an <emulation> tag may be used to assemble the data referenced by such tags. During run time, the assembled data is used to create a data structure accessible by the various components of the GPF 210. The data structure is referred to herein as a reference model. Static values can be stored in the PROTOCOL EMULATION definition files 214 and pre-loaded into the reference model. Dynamic values or values that require user input may be externally supplied and communicated to the appropriate component of the GPF 210 using a communication process based on the data structures described in the <parcels> section. In general each protocol emulation instance, termed a "session", running on the system will access one or more reference models to obtain configuration and control data. It may prove beneficial to define and create a reference model (or set of reference models) for each type of protocol emulation to be activated on the system.

A general structure of reference models along with a suitable XML syntax is presented in co-pending U.S. patent application Ser. No. 10/851,303 entitled DISTRIBUTED DATA MODEL. The '303 application focuses on specifics of a particular sub-set of the XML syntax, that contained with <parcels> tags (used to describe the commands and communication data structures). The '303 application was filed on May 21, 2004, is assigned to the assignee of the present application, and is incorporated herein by reference. The present invention extends some of the concepts described in the '303 application to the entire suite of protocol emulation software. Further aspects of the present invention will become apparent upon review of the detailed description and appended claims.

In one embodiment, the GPF 210 further comprises a generic, self-documenting API. The commands and parameters associated with such an API can be described in the protocol emulation definition files 214, along with any help text. This allows new commands to be created without writing any framework code. Through the use of tools such as tool control language ("Tcl"), entire protocol emulations can be defined in XML and Tcl to run within the framework. This empowers users and technical support engineers to test new protocols immediately without waiting for a supplier to deliver a custom protocol module (e.g. module 212$n$). Such a generic emulation would appear identical to the API and GUI as a regular emulation. While there may be performance limitations to such a completely generic solution, the time-to market window is substantially improved. Should higher performance be required, custom module may be provided.

Figure 3:
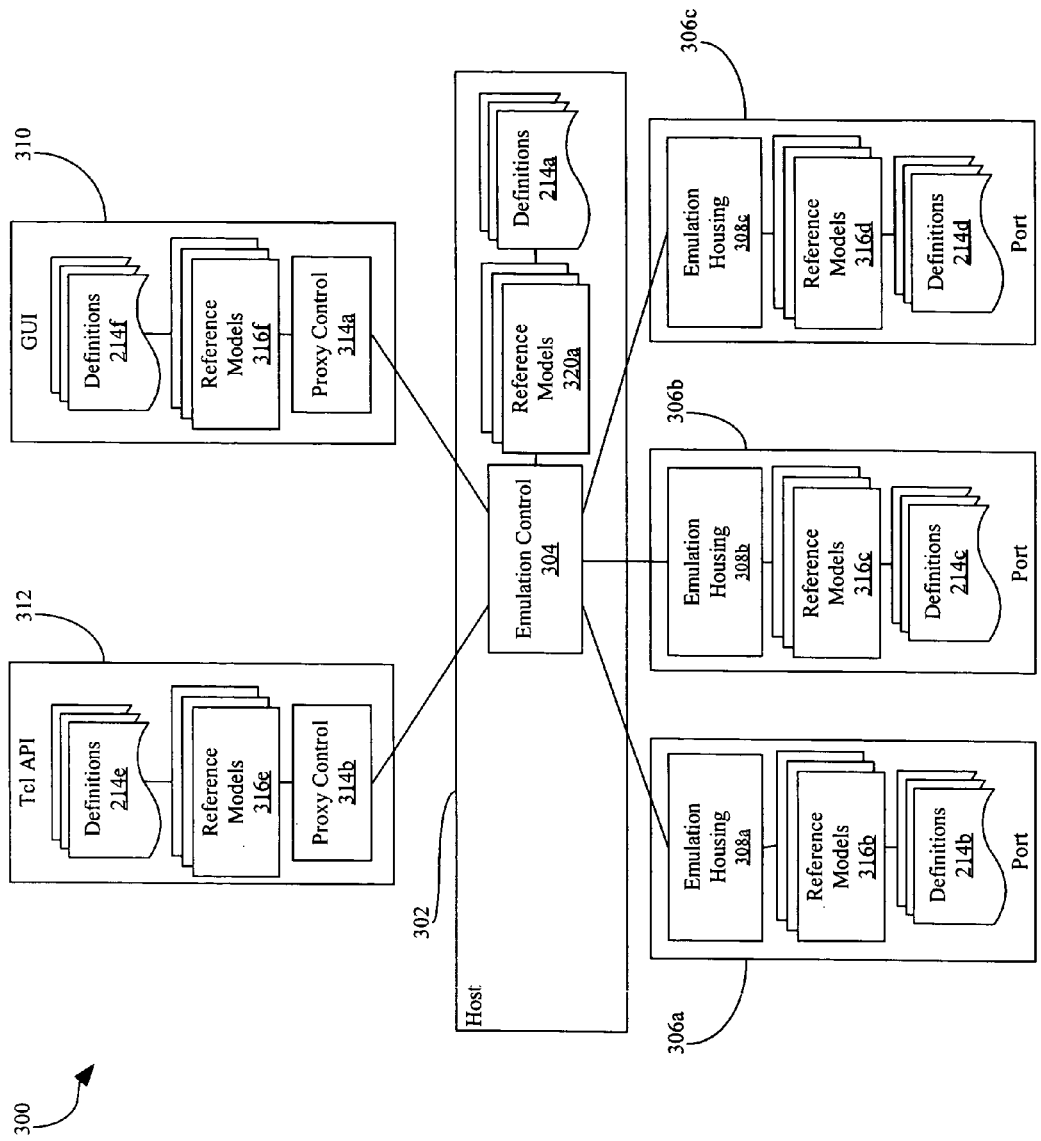
FIG. 3 is a block diagram of a generic protocol framework deployed into a target platform in accordance with embodiments of the present invention.

FIG. 3 is a block diagram of a generic protocol framework 300 deployed into a target platform in accordance with embodiments of the present invention. A generic protocol framework 300 (GPF 300) generally comprises three components: an emulation control 304; emulation housings 308$n$; and proxy controls 314$n$. The emulation control 304 manages protocol sessions (not shown, but described hereinafter) and resides on a host 302. Generally, the emulation control 304 creates and removes sessions. The host 302 generally, but not necessarily, comprises a computer such as a PC running the WINDOWS operating system. The emulation housings 308$n$ house the protocol sessions providing configured resources and session data. The emulation housings 308$n$ provide a bi-directional data conduit to the emulation control 304 for each protocol session. The emulation housing generally resides on a port 306$n$. Each port 306 $n$ typically resides on a protocol emulation card (not shown, but see element 102$n$ in FIG. 1). The proxy controls 314$n$ facilitate the remote control of the emulation control 304 by providing access to emulation control commands and data. Proxy controls 314$n$ can be provided to a variety of functional components, including the shown GUI 310 and Tcl API 312.

Each component is provided with protocol emulation definitions 214$n$. In general, the protocol emulation definitions 214$n$ are all the same for any given protocol. What may vary is whether any particular component is provided with the same set of protocol emulation definitions. For example, an emulation housing 308$n$ does not require a protocol emulation definition 214$n$ for a protocol that will not be executed on that particular port 306$n$.

From the definitions, as discussed hereinafter in more detail, the components generate reference models 316$n$. The reference models 316$n$ store data that allows each component to configure, execute and communicate with the other components. This data includes data structures, configuration data, data communication structures (and in effect methods), commands, and descriptions of the foregoing to facilitate their use.

In at least one embodiment, communication to and from the emulation control 304 is accomplished using messages created (or instantiated) using information contained within the reference models 316$n$. Such messages, termed "parcels" may contain data or commands. The commands may be used to direct the emulation control 304 to undertake an action, such as the creation of a protocol emulation session. The data may include information necessary to complete a command or for reporting data from or to the emulation control 304. In particular parcels are used to communicate data, including data referenced within other segments of the reference model(s), including for example information associated with <filter> and <socket> tags.

Emulation Control

Figure 4:
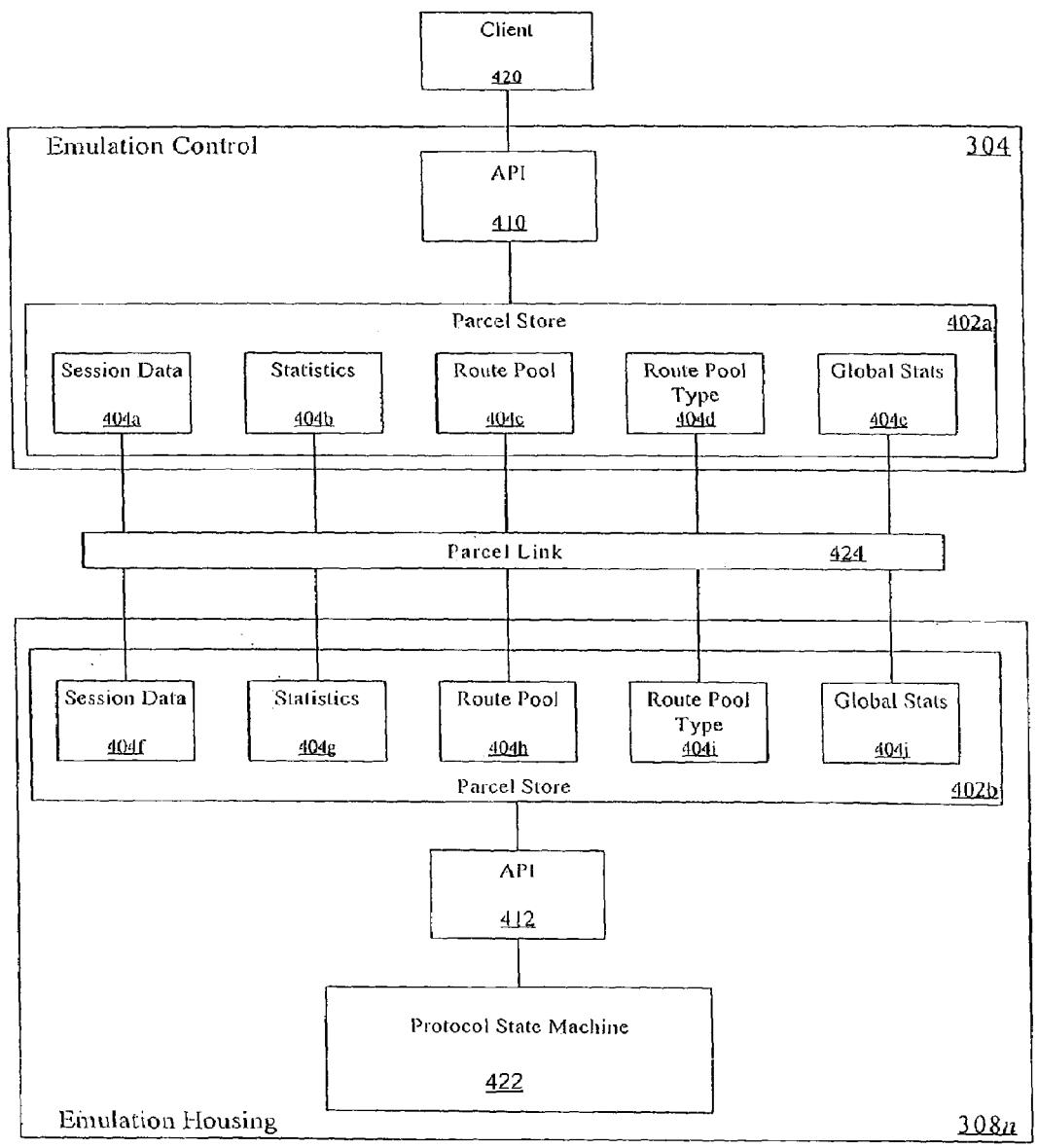
FIG. 4 is a block diagram useful for explaining the operation of an emulation control in accordance with at least one embodiment of the present invention.

FIG. 4 is a block diagram useful for explaining the operation of an emulation control 304 in accordance with at least one embodiment of the present invention. The emulation control 304 provides an API 410 to interface with a client 420, for example the GUI 310 (see FIG. 3). The API 410 provides a central conduit for the passage of commands and data from and to the client 420. In accordance with at least one embodiment, the client 420 can comprise any device or software provided with a proxy control 314 (see FIG. 3)

The API 410 is generally responsible for the creation and transmission of messages between the client 420 and the emulation control 304. An API 312 is provided in an emulation housing 308a to similarly act as a conduit between a protocol state machine 422 and the emulation control 304. In at least some embodiments, and as described herein below, the messages are created based upon data contained within <parcel> tags in the protocol emulation definition file 214.

The message creation process, more fully described in co-pending U.S. application #10/851,303, basically comprises the creation of a reference model based upon the contents of the protocol emulation definition file 214, followed by the instantiation of an object based on the reference model, or portion thereof. The object is populated with data from any number of sources, including the protocol emulation definition file 214, the reference model created based on the protocol emulation definition file 214, and a user. By pre-defining the data structure in a document external to the API, the API can be structured in a generic manner without requiring emulation specific provisions. Other benefits such as the enabling of a generic user interface and reduced messaging bandwidth are discussed hereinafter.

The messages that the API 410 forms and transmit perform a variety of functions. One such function is the creation, configuration and removal of sessions. As noted above, as used herein the term session generally refers to an instance of a protocol emulation. Table 1 is a portion of self-documenting C++ code describing a management interface to an emulation control forming part of an API suitable for use with the APIs 410 and 412 along with the proxy controls 314n.

TABLE 1

```
#ifndef APF_EMULATION_CONTROL_H
#define APF_EMULATION_CONTROL_H
// ============================================================================
//
// = LIBRARY
//      APF Agilent Protocol Framework
//
// = FILENAME
//      apfEmulationControl.h
//
// = DESCRIPTION
//
// The Emulation Control interface
//
// = AUTHORS
//      Geoff Smith
//
// = COPYRIGHT
//      (C) Copyright 2004 Agilent Technologies
//
// ============================================================================
#include "apfParcelStore.h"
#include "apfParcelLink.h"
//-------------------------------------------------------------------
// = TITLE
//      Emulation Control Interface
//
// = CLASS TYPE
//      Interface
//
// = DESCRIPTION
//      Management interface to the emulation framework
class APB_EXPORT_CLASS IApfEmulationControl
{
public:
    virtual ~IApfEmulationControl( ) { }
    // = EMULATION INFORMATION
    // Each protocol emulation definition is identified by a unique emulation name
    virtual void
    listEmulations(AtoList<AtoString>& emulationList) const = 0;
    // List the emulation names defined in XML
    virtual IApfRefEmulation*
    getRefEmulation(const AtoString& aEmulation) = 0;
    // Access the reference database for an emulation
    virtual IApfRefEmulation*
    getRefEmulation(uint32_t aSession) const = 0;
    // Access the reference database for an emulation, identified by session handle
    // = SESSION MANAGEMENT
    // One or more emulation sessions may be created from a specified emulation
    virtual uint32_t
```

TABLE 1-continued

```
createSession(uint32_t aPort, const AtoString& aEmulation, uint32_t alterationCount = 1) = 0;
// Add a new emulation session. Returns a unique session handle
virtual void
removeSession(uint32_t aSession) = 0;
// Remove an existing emulation session
virtual void
removeSessionsOnPort(uint32_t aPort) = 0;
// Remove all emulations sessions running on the specified port
virtual void
listAllSessions(AtoVector<uint32_t>& sessionList) const = 0;
// List all emulation sessions on all ports
virtual void
listPorts(AtoVector<uint32_t>& portList) const = 0;
// Ports are managed by the application, so this method is not strictly necessary,
// but it is provided for convenience, and for testing.
virtual void
listSessionsOnPort(uint32_t aPort, AtoVector<uint32_t>& sessionList) = 0;
// List emulation sessions on the specified port
virtual bool
isValidSession(uint32_t aSession) const = 0;
virtual bool
isValidPort(uint32_t aPort) const = 0;
// = PARCEL STORE
virtual IApfParcelStore&
sessionStore(uint32_t aSession) = 0;
virtual IApfParcelStore&
globalStore( ) = 0;
// = SESSION COMMANDS
virtual const AtoString&
sessionName(uint32_t aSession) const = 0; // returns "unknown" if aSession not known
virtual EApbResult
setSessionName(uint32_t aSession, const AtoString& aName) = 0;
// Session status is available from the "sessionStatus" parcel defined in AgtEmu_GlobalSession.xml
virtual EApbResult
setSessionIterationCount(uint32_t aSession, uint32_t alterationCount) = 0;
// Set the session iteration count. Minimum valid iteration count is 1
virtual EApbResult
enableSession(uint32_t aSession) = 0;
// Enable the specified sessions. Enabled sessions may process and transmit packets.
virtual EApbResult
disableSession(uint32_t aSession) = 0;
// Disable the specified sessions. Disabled sessions will not receive or transmit packets.
virtual EApfSessionState
sessionState(uint32_t aSession) = 0;
// Retrieve the current session state. Also available from the sessionStatus parcel
virtual EApbResult
tcpOpen(uint32_t aSession, const AtoString& aSocket) = 0;
// Request a connection over the specified TCP socket. As this call is not blocking,
// the socket may not be open immediately on return.
virtual EApbResult
tcpClose(uint32_t aSession, const AtoString& aSocket) = 0;
// Close a connection over the specified TCP socket
// Packet Transmit
virtual EApbResult
setTransmitCaptureMode(uint32_t aSession, EApfTransmitCaptureMode aMode) = 0;
virtual EApbResult
transmitPacket(uint32_t aSession, const AtoString& aSocket, const AtoByteString& aPacketData) = 0;
// Transmit the specified packet data over the specified socket
// = PORT COMMANDS
// Port status is available from the "portStatus" parcel defined in AgtEmu_GlobalPort.xml
// Message log
virtual void
getMessageLog(uint32_t aPort) = 0;
virtual void
setMessageTraceLevel(uint32_t aPort, EApbMsgTraceLevel aTraceLevel) = 0;
virtual void
setMessageLogMaxLines(uint32_t aPort, uint32_t aMaxLines) = 0;
// = UTILITY
virtual IApfParcelLink*
parcelLink( ) = 0;
// Access the inbound parcelLink interface for this emulation control
virtual const AtoString&
versionString( ) const = 0;
};
#endif // APF_EMULATION_CONTROL_H
```

To facilitate communication, such as between the emulation control 304 and the emulation housing 308, a series of buffers 404*n* (in this example buffers 404*a* through 404*e*) may be created in the emulation control 304. In turn, the emulation housing 308, under the guidance of an API 412, creates a series of buffers 404*n* (in this example buffers 404*f* through 404*j*) corresponding to the buffers in the emulation control 304. A similar series of buffers is created for each protocol sate machine hosted by a port. The type of buffer used may be specified in the reference model 316 by parcel type. For example, the buffer type can appear as an attribute in the XML parcel definition. Alternatively, this could be made configurable by a client application, such as a proxy control 314*n*. The buffers 404*n* are connected by a parcel link 424 that generally comprises a serial communication path. FIG. 4 illustrates the providing of matching buffers for each of the illustrated parcel types, however, it may also prove preferable to provide only the receiving buffer where the flow of data is unidirectional.

While the exact nature of the buffers 404 will vary for any given implementation of the present invention, it may prove preferable to create a separate buffer 404*n* for each type of parcel to be passed between the emulation control 304 and the emulation housing 308*n*. In general, the type of parcel is determined by the data encapsulated therein. There exist a variety of buffer types any of which may prove beneficial depending on how the data in the parcel is to be used. It may prove beneficial to define different buffer types for different parcel types.

In general, buffering means the temporary holding of parcels (or segments thereof) until the receiving (or transmitting) system is prepared to process the information contained in the parcel. For example, to minimize host load, a client from a buffer on the transmitting side can pull parcels. Alternatively, parcels can be pushed by the transmitting side to a variety of types of buffers on the receiving side to optimize responsiveness. A type of buffer may be specified for each parcel and/or parcel type. Alternatively, a bank of different buffer types may be initialized and messages can be deposited in a buffer based on the type of the buffer. Some examples of suitable buffer types are disclosed in Table 2:

TABLE 2

| Buffer Type | Description |
|---|---|
| retain | (Push) Each new parcel version received is retained in a circular buffer until deleted by the client |
| fifo | (Push) Parcels are placed in a FIFO buffer and deleted from the buffer when read by the client |
| newest | (Push) The buffered parcel is replaced by the most recent incoming version. Parcels with a root key specified may be consolidated according to the key value. This feature allows parcels from many sources to be automatically consolidated into a summary parcel at the destination. |
| fetch | (Pull) Parcels are not sent to the destination store until requested by the destination |

FIG. 4 illustrates the creation of buffers for specific parcel types, including session data; statistics; route pool; route pool type, and global statistics. Table 3 provides a more detailed description of some possible parcel types and their appropriate buffer type.

TABLE 3

| Message Type | Definition Context | Buffer | Description |
|---|---|---|---|
| Parcel Class | Global | Newest | Status information about a protocol state machine. |
| sessionData | Per Session | Newest | Data associated with setting up the protocol state machine. |
| TopologySummary | Per Emulation | Newest | Summary information about the topology in a protocol state machine. |
| destinationPools | Global | Fetch | Destination address information used for traffic integration |
| TopologyData | Per Emulation | Fetch | Detail topology data for a protocol state machine. |
| Globalstatistics | Global | Newest | Pre-defined statistics |
| Statistics | Per Emulation | Newest | Per-emulation statistics |
| EventLog | Global | Fetch | Event data for an emulation |
| messageTrace | Global | FIFO | Tx/Rx message trace for an emulation |

The buffers and the routines that facilitate their operation are collectively part of a set of procedures are termed herein a parcel store 402 and 404. In one embodiment, the functional component of the parcel stores 402 and 404 are created and maintained by the APIs 410 and 412 respectively. Further functions of the parcel store include the storing and maintaining of parcel reference model from which message objects can be instantiated. The parcel objects themselves are stored in and retrieved from the buffers 404. Table 4 is a portion of self-documenting C++ code describing the functions of a parcel store.

[0048] Table 4

```
#ifndef APF_PARCEL_STORE_H
#define APF_PARCEL_STORE_H
// ================================================================
//
// = LIBRARY
//      APF  Agilent Protocol Framework
//
// = FILENAME
//      ApfParcelStore.h
//
// = DESCRIPTION
```

```
//
// Interface to the parcel store.  Interfaces defined:
//    IApfParcelStore
//    DECLARE_PARCEL_TYPE and DEFINE_PARCEL_TYPE
//    ApfParcel<ParcelType>
//    IApfParcelBuffer
//    ApfParcelBuffer<ParcelType>
//
// = AUTHORS
//       Geoff Smith
//
// = COPYRIGHT
//       (C) Copyright 2004 Agilent Technologies
//
// ===================================================================== include "emuframework/include/apfParcel.h"

class IApfParcelBuffer;

//-----------------------------------------------------------------
// = TITLE
//       Parcel Store
//
// = CLASS TYPE
//       Interface
//
// = DESCRIPTION
// Client interface to the Parcel Store. An IApfParcelStore interface
// is created for each session
class APB_EXPORT_CLASS IApfParcelStore
{
public:

// = FOUNDATION virtual ~IApfParcelStore() {}

// = ACCESS virtual EApfStoreType
  storeType() const = 0;

virtual uint32_t
  sessionHandle() const = 0;

virtual const AtoString&
  sessionName() const = 0;

virtual uint32_t
  port() const = 0;

virtual IApfRefEmulation*
  refEmulation() const = 0;

virtual uint32_t
  maxIteration() const = 0;

virtual IApfRefParcel*
  refParcel(const AtoString& aParcelName) const = 0;

// = OUTGOING PARCELS
```

```
virtual void
sendParcel(const CApfParcel& aParcel) = 0;

// = INCOMING COMMAND PARCELS

// A client may subscribe to be notified on receipt of specific command parcels.

virtual void
subscribeCommandParcel(const AtoString& aParcelName, AtoObserverBC<CApfParcel>& aObserver) = 0;

virtual void
unsubscribeCommandParcel(const AtoString& aParcelName, AtoObserverBC<CApfParcel>& aObserver) = 0;

// = INCOMING PARCEL BUFFERS

// Incoming session parcels are buffered according to the parcel's buffer type.
// Access to the parcel is via the IApfParcelBuffer interface, or the ApfParcelBuffer typed interface.
// These methods will return zero if the requested buffer is not available virtual IApfParcelBuffer*
getBufferByName(const AtoString& aParcelName) = 0;

virtual IApfParcelBuffer*
getBufferByClass(EApfParcelClass aClass) = 0;

virtual void
listBuffers(AtoVector<IApfParcelBuffer*>& aBufferList) const = 0;
};

//------------------------------------------------------------------
// = TITLE
//      Parcel Type declaration and definition.
// Provides compile time type safety for parcel objects.
//
// = USAGE
//      In the header file:
//   DECLARE_PARCEL_TYPE(myParcel);
// In the cpp file
//   DEFINE_PARCEL_TYPE(myParcel);
//
// In the cpp implementation:
//
// Assuming IApfParcelStore& myStore is known:
//
// // Create some parcels
// ApfParcel<myParcel> parcel1(myStore);
// ApfParcel<myParcel> parcel2(myStore);
// ApfParcel<otherPcl> parcel3(myStore);
//
// // Assignment
// parcel2 = parcel1;  // OK
// parcel3 = parcel1;  // Compile time error
//
// // Copy the incoming parcel buffer into the parcel:
// parcel2.refresh();
//
// // Send a parcel
// parcel2.send();
//
// // Access the incoming parcel buffer
// ApfParcelBuffer<myParcel> buf1(myStore);
```

```
// const ApfParcel<myParcel>& inParcel = buf1.typedParcel();

//----------------------------------------------------------------
class APB_EXPORT_CLASS CApfParcelTypeBC
{
public:
    CApfParcelTypeBC(IApfParcelStore& aParcelStore, IApfRefParcel& aRefParcel);

IApfParcelStore&
    getParcelStore();

const IApfParcelStore&
    getParcelStore() const;

IApfRefParcel&
    getRefParcel();

const IApfRefParcel&
    getRefParcel() const;

private:
    IApfParcelStore&    m_parcelStore;
    IApfRefParcel&      m_refParcel;
};

//----------------------------------------------------------------
class APB_EXPORT_CLASS ApfDynamicParcelType : public CApfParcelTypeBC
{
public:
    ApfDynamicParcelType(IApfParcelStore& aStore, IApfRefParcel& aRefParcel)
        : CApfParcelTypeBC(aStore, aRefParcel) {}
};

//----------------------------------------------------------------
#define DECLARE_PARCEL_TYPE(aParcelType_) \
    class APB_EXPORT_CLASS aParcelType_ : public CApfParcelTypeBC \
    { \
    public: \
        aParcelType_(IApfParcelStore& aStore); \
    };

#define DEFINE_PARCEL_TYPE(aParcelType_) \
    aParcelType_::aParcelType_(IApfParcelStore& aStore) \
        : CApfParcelTypeBC(aStore, *aStore.refParcel(#aParcelType_) ) \
    { \
        ATO_ENSURE(&getRefParcel() != 0, atoAbortCtorFailure, \
            "Unable to create parcel type = " << #aParcelType_); \
    } template <class ParcelType> class ApfParcelBuffer;

//----------------------------------------------------------------
// = TITLE
//      Typed Parcel
//
// = CLASS TYPE
//      Template
//
// = DESCRIPTION
//  A type safe parcel.
//
//  Type is defined by class "ParcelType", which is defined using the
```

```cpp
// DECLARE_PARCEL_TYPE / DEFINE_PARCEL_TYPE macros above
template <class ParcelType>
class ApfParcel : private ParcelType, public CApfParcel
{
public:
  // = FOUNDATION ApfParcel(IApfParcelStore& aStore, EApfParcelState aInitialState = APF_PARCEL_STATE_OPEN);

ApfParcel(const ParcelType& aType, EApfParcelState aInitialState = APF_PARCEL_STATE_OPEN);

// Type safe copy ctor and assignment operator. An attempt to copy a mismatching
  // parcel will cause a compile time error
  ApfParcel(const ApfParcel& aTypedParcel);

ApfParcel& operator=(const ApfParcel& aTypedParcel);

// Non-type safe assignment operator. An attempt to assign a mismatching
  // parcel gives a run-time error
  ApfParcel& operator=(const CApfParcel& aParcel);

// = UTILITY void send();
  // Send this parcel using the associated parcel store void refresh();
  // Update this parcel from the incoming parcel buffer, if new data is available ApfParcelBuffer<ParcelType> buffer();
  // Create a typed buffer interface to the incoming parcel buffer associated
  // with the parcel type.
  // Note that ApfParcelBuffer is an interface only - this method does not create
  // a new buffer.
};

//--------------------------------------------------------------------
// = TITLE
//       Parcel Buffer
//
// = CLASS TYPE
//       Interface
//
// = DESCRIPTION
// Interface to a incoming parcel buffer. The buffer provides access to
// a single parcel object, which exists for the lifetime of the buffer.
// Depending on the buffer type, incoming parcel updates may be queued, or
// automatically applied to the parcel object as follows:
// Buffer type    Action
// RETAIN & FIFO  Queue incoming parcels and leave parcel object unchanged, unless
//                parcel object is currently CLOSED.
// NEWEST & FETCH Update the parcel object with the incoming parcel class APB_EXPORT_CLASS IApfParcelBuffer
{
public:
  // = FOUNDATION virtual ~IApfParcelBuffer() {}

// = PARCEL EVENTS
```

```
virtual void
subscribeBufferUpdates(AtoObserverBC<IApfParcelBuffer>& anObserver) = 0;

virtual void
unsubscribeBufferUpdates(AtoObserverBC<IApfParcelBuffer>& anObserver) = 0;

// = ACCESS virtual EApfBufferType
bufferType() const = 0;

virtual const CApfParcel&
parcel() const = 0;
// Access the buffer parcel virtual const ApfParcel<ApfDynamicParcelType>&
dynamicTypedParcel() const = 0;
// Access the buffer parcel as a ApfParcel<ApfDynamicParcelType>.
// This method is intended primarily for use in conjunction with the
// typed parcel buffer ApfParcelBuffer<ParcelType>, defined below.

virtual void
fetchUpdate() = 0;
// Send a request to the parcel's server to send the parcel. Intended primarily
// for buffer type == FETCH. This method must be used to update the parcel if the
// current parcel state is CLOSED.

// = BUFFER MANAGEMENT (FIFO and RETAIN buffer types only)

virtual uint32_t
bufferCount() const = 0;
// See setMaxParcelCount() below virtual void
popBuffer() = 0;
// Refresh the parcel with the next parcel in the buffer. Client must ensure
// that bufferCount() is > 0. popBuffer() reduces the buffer count by 1.

virtual void
useBuffer(uint32_t aIndex) = 0;
// Refresh the parcel with the specified buffer entry. Client must ensure
// that aIndex < parcelCount(). setParcel() does not affect the parcel count.

virtual void
deleteBuffer(uint32_t aIndex) = 0;

virtual void
clearBuffers() = 0;
// Delete all buffers

// The parcel buffer has a default max buffer count of 1. This avoids
// the possiblity of a memory leak caused by multiple proxies receiving parcels into
// FIFO or RETAIN buffers, when not all proxies have an active client to manage the
// buffer.
// If a client wants a buffer to hold more than one parcel, it sets the max count
// explicitly.

virtual uint32_t
maxBufferCount() const = 0;
// Default = 1. Adjust using setMaxBufferCount()

virtual void
```

```
    setMaxBufferCount(uint32_t aCount) = 0;
    // Effective only for RETAIN and FIFO buffers.
};

//------------------------------------------------------------------
// = TITLE
//       Typed Parcel Buffer
//
// = CLASS TYPE
//       Template
//
// = DESCRIPTION
// A type safe interface to the parcel buffer
template <class ParcelType>
class ApfParcelBuffer : private ParcelType, public IApfParcelBuffer
{
public:
  // = FOUNDATION ApfParcelBuffer(IApfParcelStore& aStore);

// = Typed parcel const ApfParcel<ParcelType>&
  typedParcel() const;
  // Compile-time type safe access to the parcel // = IApfParcelBuffer methods void
  subscribeBufferUpdates(AtoObserverBC<IApfParcelBuffer>& anObserver);

void
  unsubscribeBufferUpdates(AtoObserverBC<IApfParcelBuffer>& anObserver);

EApfBufferType bufferType() const;

const CApfParcel& parcel() const;

const ApfParcel<ApfDynamicParcelType>& dynamicTypedParcel() const;

void fetchUpdate();

uint32_t bufferCount() const;

void popBuffer();

void useBuffer(uint32_t aIndex);

void deleteBuffer(uint32_t aIndex);

void clearBuffers();

uint32_t maxBufferCount() const;

void setMaxBufferCount(uint32_t aCount);

private:
  IApfParcelBuffer&  m_buffer;
};

// *************************************************************************
```

```
// ApfParcel<ParcelType> implementation
// ************************************************************************
template <class ParcelType>
ApfParcel<ParcelType>::ApfParcel(IApfParcelStore& aStore, EApfParcelState aInitialState)
    : ParcelType(aStore),
      CApfParcel(getRefParcel(), aInitialState)
{ }

// ------------------------------------------------------------------------
template <class ParcelType>
ApfParcel<ParcelType>::ApfParcel(const ParcelType& aType, EApfParcelState aInitialState)
    : ParcelType(aType),
      CApfParcel(getRefParcel(), aInitialState)
{ }

// ------------------------------------------------------------------------
template <class ParcelType>
ApfParcel<ParcelType>::ApfParcel(const ApfParcel& aTypedParcel)
    : ParcelType(aTypedParcel.getParcelStore()),
      CApfParcel(aTypedParcel)
{}

// ------------------------------------------------------------------------
template <class ParcelType>
ApfParcel<ParcelType>&
ApfParcel<ParcelType>::operator=(const ApfParcel<ParcelType>& aTypedParcel)
{
    // compiler ensures that types match at compile time
    CApfParcel::assign(aTypedParcel, getParcelStore().storeType());
    return *this;
}

// ------------------------------------------------------------------------
template <class ParcelType>
ApfParcel<ParcelType>&
ApfParcel<ParcelType>::operator=(const CApfParcel& aParcel)
{
    // assign will assert if types dont match at run time
    CApfParcel::assign(aParcel, getParcelStore().storeType());
    return *this;
}

// ------------------------------------------------------------------------
template <class ParcelType>
void
ApfParcel<ParcelType>::send()
{
    getParcelStore().sendParcel(*this);
}

// ------------------------------------------------------------------------
template <class ParcelType>
void
ApfParcel<ParcelType>::refresh()
{
    ApfParcelBuffer<ParcelType> buffer(getParcelStore());
    const ApfParcel<ParcelType>& in = buffer.typedParcel();
    if (in.parcelState() == APF_PARCEL_STATE_OPEN && in.isParcelChanged())
    {
        CApfParcel::assign(in, getParcelStore().storeType());
    }
}
```

```
// -----------------------------------------------------------------
template <class ParcelType>
ApfParcelBuffer<ParcelType>
ApfParcel<ParcelType>::buffer()
{
   return ApfParcelBuffer<ParcelType>(getParcelStore());
}

// *****************************************************************
// ApfParcelBuffer<ParcelType> implementation
// ***************************************************************** template <class ParcelType>
ApfParcelBuffer<ParcelType>::ApfParcelBuffer(IApfParcelStore& aStore)
   : ParcelType(aStore),
     m_buffer(*aStore.getBufferByName(getRefParcel().name()))
{ }

// -----------------------------------------------------------------
template <class ParcelType>
const ApfParcel<ParcelType>&
ApfParcelBuffer<ParcelType>::typedParcel() const
{
   // m_buffer.dynamicTypedParcel() returns ApfParcel<ApfDynamicParcelType>&,
   // which is carefully structured to match ApfParcel<ParcelType> in every aspect
   // except the constructor.
   // As the object is already constructed, it is therefore safe to reinterpret_cast.
   return reinterpret_cast<const ApfParcel<ParcelType>&>(m_buffer.dynamicTypedParcel());
}

// -----------------------------------------------------------------
template <class ParcelType>
void
ApfParcelBuffer<ParcelType>::subscribeBufferUpdates(
   AtoObserverBC<IApfParcelBuffer>& anObserver)
{
   m_buffer.subscribeBufferUpdates(anObserver);
}

// -----------------------------------------------------------------
template <class ParcelType>
void
ApfParcelBuffer<ParcelType>::unsubscribeBufferUpdates(
   AtoObserverBC<IApfParcelBuffer>& anObserver)
{
   m_buffer.unsubscribeBufferUpdates(anObserver);
}

// -----------------------------------------------------------------
template <class ParcelType>
EApfBufferType
ApfParcelBuffer<ParcelType>::bufferType() const
{
   return m_buffer.bufferType();
}

// -----------------------------------------------------------------
template <class ParcelType>
const CApfParcel&
ApfParcelBuffer<ParcelType>::parcel() const
{
```

```
    return m_buffer.parcel();
}

// ----------------------------------------------------------------
template <class ParcelType>
const ApfParcel<ApfDynamicParcelType>&
ApfParcelBuffer<ParcelType>::dynamicTypedParcel() const
{
    return m_buffer.dynamicTypedParcel();
}

// ----------------------------------------------------------------
template <class ParcelType>
void
ApfParcelBuffer<ParcelType>::fetchUpdate()
{
    m_buffer.fetchUpdate();
}

// ----------------------------------------------------------------
template <class ParcelType>
uint32_t
ApfParcelBuffer<ParcelType>::bufferCount() const
{
    return m_buffer.bufferCount();
}

// ----------------------------------------------------------------
template <class ParcelType>
void
ApfParcelBuffer<ParcelType>::popBuffer()
{
    m_buffer.popBuffer();
}

// ----------------------------------------------------------------
template <class ParcelType>
void
ApfParcelBuffer<ParcelType>::useBuffer(uint32_t aIndex)
{
    m_buffer.useBuffer(aIndex);
}

// ----------------------------------------------------------------
template <class ParcelType>
void
ApfParcelBuffer<ParcelType>::deleteBuffer(uint32_t aIndex)
{
    m_buffer.deleteBuffer(aIndex);
}

// ----------------------------------------------------------------
template <class ParcelType>
void
ApfParcelBuffer<ParcelType>::clearBuffers()
{
    m_buffer.clearBuffers();
}

// ----------------------------------------------------------------
template <class ParcelType>
uint32_t
```

```
ApfParcelBuffer<ParcelType>::maxBufferCount() const
{
   return m_buffer.maxBufferCount();
}

// ------------------------------------------------------------------------
template <class ParcelType>
void
ApfParcelBuffer<ParcelType>::setMaxBufferCount(uint32_t aCount)
{
   m_buffer.setMaxBufferCount(aCount);
}

// ------------------------------------------------------------------------ endif // APF_PARCEL_STORE_H
```

The parcel store 402a can be configured to retain a copy of the most recent of each parcel sent to an emulation housing 308n. Utilizing this configuration, a backup function can be implemented that saves the current configuration of the emulation control 304 by saving the parcels in the parcel store 402a including the most recently transferred parcels. The backup is effected by serialising each active session. Each active session is serialised by serialising all the parcels in the parcel store. The configuration can then be restored by recreating each saved session and populating it with the restored parcels.

Emulation Housing

The emulation housings 308 generally function as an interface between the GPF 210 and the an embedded custom component, such as a protocol state machine 308n. The emulation housings 308 receive messages in the form of serialized parcels, reconstructs the parcels, and distributes the data in the parcel to the components of the embedded custom component. In turn the emulation housings 308 receive data from the components of the embedded custom components, creates parcels based thereon and transmits said parcels to the emulation control 304. In the context of a protocol emulation system, each session is provided with an emulation housing 308n which in turn communicate with the emulation control 304.

Figure 5:
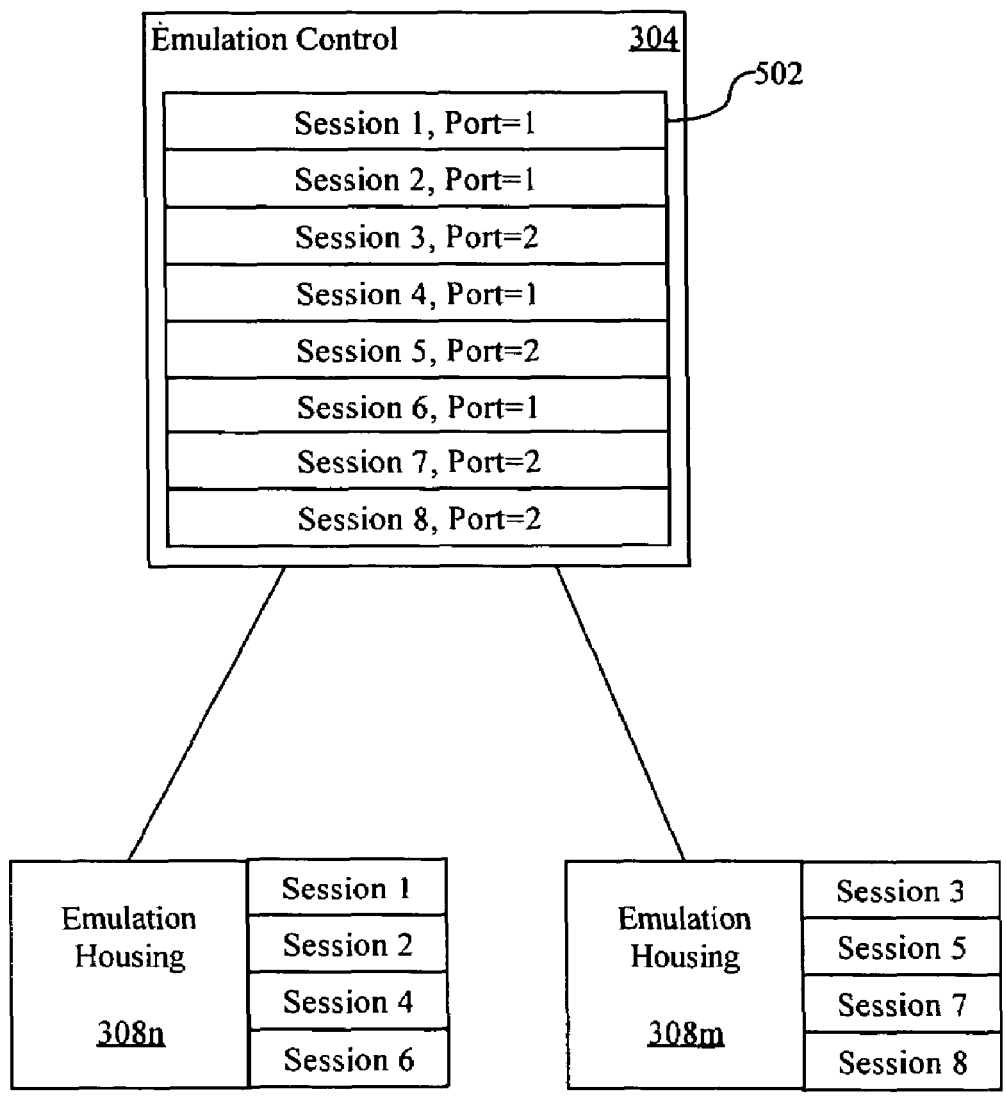
FIG. 5 is a block diagram of a generic protocol session model in accordance with embodiments of the present invention.

FIG. 5 is a block diagram of a generic protocol session model in accordance with embodiments of the present invention. In general, an instance of a protocol state machine (and associated support code) running on a test port is termed a session. FIG. 5 illustrates eight sessions S1-S8 running on two ports 306x and 306y. The ports 306n and the sessions Sn are responsive to the emulation control 304 that maintains a table 502 to keep track of the individual sessions.

The emulation control 304 provides API services and buffers for each session. As described hereinabove, the API and buffers facilitate communication between the emulation control 304 and the sessions Sn. Emulation housings 308m and 308n provide an API and buffers for each session Sn running on a port 306n. The emulation housings 308n are responsible for creating and deleting sessions on a specified port 306n.

Figure 6:
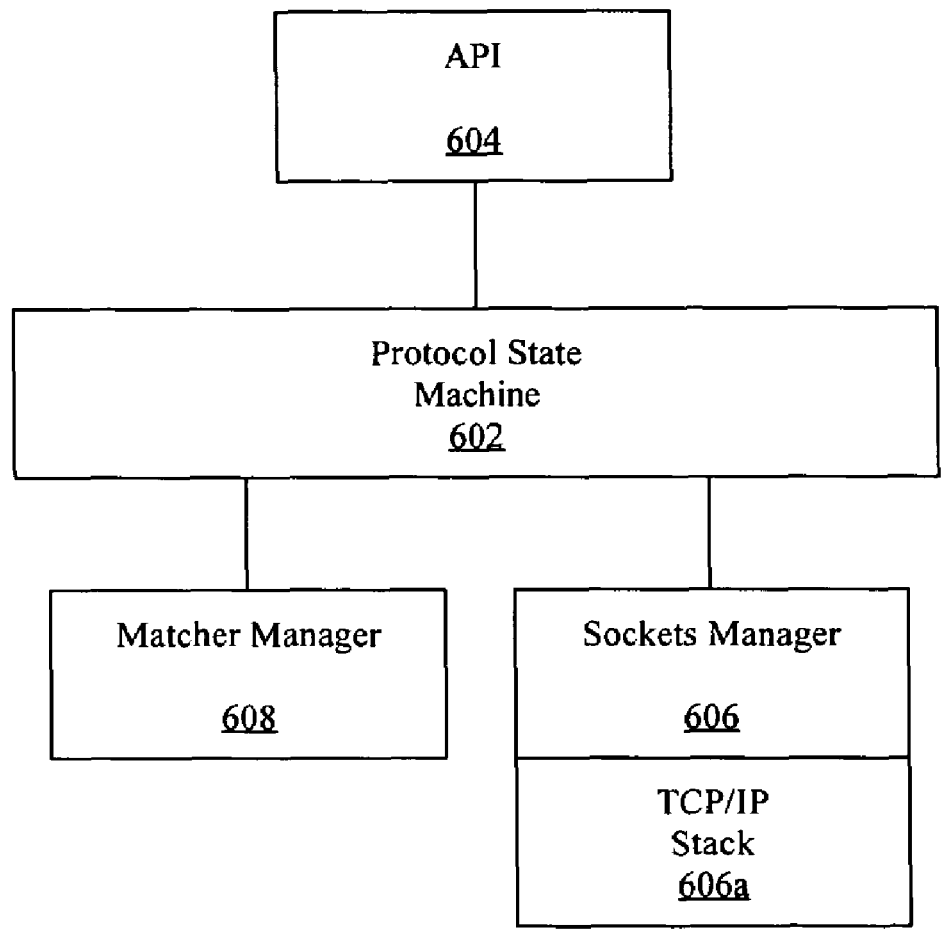
FIG. 6 is block diagram of a protocol infrastructure in accordance with embodiments of the present invention.

Each session Sn requires several resources to operate. These resources include: hardware pattern matches; a socket over which to operate (such as a TCP/IP socket); and an API for communication and control. FIG. 6 is block diagram of a protocol infrastructure in accordance with embodiments of the present invention. In FIG. 6 a protocol state machine 602 is shown in communication with an API 604 (which may be an instance of the API 412 shown in FIG. 4); sockets manager 606; and matcher manager 608. The API 604, sockets manager 606 and matcher manager 608 collectively form an embodiment of the emulation housing 308 (see FIGS. 3 and 4).

On startup the API 604 generates reference models based on protocol emulation definition files 610. The protocol emulation definition files 610 are copies of the protocol emulation definition files 214 which should mean that the reference models generated under control of the API 604 match the reference models generated under control of the API 410. Thus, the API 504 is able to communicate with the emulation control 304 (see FIG. 3) on the host 302 using instantiated instances of parcels.

The API 604 receives data from the emulation control 304 and distributes data to the other components of the emulation housing and the protocol state machine 602. In turn the API 604 receives, and forwards to the emulation control 304, data from the other components of the emulation housing 308 and the protocol state machine 602. Communication with the emulation control 304 may take place using the series of parcel stores and their attendant buffers described hereinabove.

The API 604 also manages configuration data to the protocol state machine 602, the matcher manager 608 and the sockets manager 506. In one embodiment, the reference model is configured to store static information pertaining to all sessions of a particular emulation type. The socket manager 606 combines static information with volatile information pertaining to the specific session by reading values transmitted from the emulation control 304, for example using session data parcels. The socket definition in the reference model can be configured to cross-reference values in the session data parcel.

The sockets manager 606 sets up and maintains a communication channel. In the example shown in FIG. 4, the sockets manager 606 maintains a TCP/IP stack 606a. When a protocol emulation session is enabled within the emulation housing 308n, the reference model constructed by the API 604 is consulted to find the sockets configuration required for the session. For each socket, the socket manager 606 uses the reference model to construct the required socket. Sockets may be created individually per session, per interface, or globally for the housing. Therefore the socket manager 606 maintains a reference count of sockets that are shared by multiple sessions. For example, when global sockets are used, a socket is created the first time a session requests it. Subsequent sessions may be given the existing global socket—a new one is not created. The global socket is destroyed only when all sessions using that socket are also disabled or destroyed.

The emulation matcher manager 608 manages hardware matchers, also termed "filters." Filters may be used to select messages, or portions thereof, of protocol messages received by the protocol state machine 602 from a router under test. The selected messages may be stored for analysis and reporting. One possible implementation of such filters is discussed in co-pending U.S. application Ser. No. 10/861,618 filed Jun. 15, 2004 that is incorporated herein by reference. When a protocol emulation session is enabled within the emulation housing 308n, the reference model is consulted to find the filters required for the session. For each filter, the matcher manager 608 (or filter manager), uses the reference model to construct the required filter. In general, filters may be completely defined by the static information in the reference model. Filters may be shared by all sessions of the same type. Therefore the matcher manager 608 maintains a reference count to ensure that hardware resources are not unnecessarily consumed by creating duplicate filters of a particular type. When a session is disabled, the corresponding filters are removed only when all sessions using that filter are disabled.

Proxy Control

Referring to FIG. 3, the proxy controllers 314n generally comprise an API similar to those discussed hereinabove and associated protocol emulation definition files. Such an API provides a convenient encapsulated solution for communication with the emulation control 304 on the host 302. As messaging is accomplished using parcel objects control over the emulation can reside in any device with the ability to create the parcel objects, e.g. any device with the appropriate API. In the example shown in FIG. 3, proxy controllers 314a and 314b are provided to GUI 310 and a Tcl API 312. Such embedding permits the control of sessions, including the creation, configuring, control and deletion thereof, using Tcl scripts.

The proxy controllers 314 may be formed by implementing the IapfEmulationControl set forth in Table 1. Each proxy control 314n maintains a reference model 316n identical to that in the emulation control 304. Each proxy controller 314n registers with an associated emulation control 304. When a parcel is received by the emulation control 304 from a housing 308n, the parcel is forwarded as is to each registered proxy control 314n. Similarly, when a proxy control 314n sends a parcel to a housing 308n, it is sent via the emulation control 304. The emulation control 304 retains a copy of the parcel and replicates it to any other proxy controls 314n. In this way, the emulation control 304 and all proxy controls 314n maintain a mirrored set of parcel buffers 404n (see FIG. 4). It is the set of parcel buffers 404n that drive the client interface.

Tcl Interface

Table 5 is a screen shot showing an example of the use of an interface created in Tcl for controlling sessions on a port via an emulation control.

TABLE 5

C:\Program Files\Agilent\N2X\RouterTester900\6.4.0.0\bin> tclsh83
% load emuframework.dll
Generic Protocol Framework
Type "gpfServerHostname <host>" to use a remote server
    "gpfConnect <session>" to connect to a test session
    "gpfDisconnect" to disconnect from the session
% gpfConnect
1
Generic Protocol Framework ( ). Copyright (C) 2004 Agilent Technologies
Type "gpfHelp" for list of commands
Global %
Global % gpfCreateSession 2 bgp4 1
bgp4-2 % gpfListBuffers
bgpSessionData packetCapture test_parcel2
bgp4-2 % gpfCreateParcel bgpSessionData
0

TABLE 5-continued bgp4-1 bgpSessionData % gpfHelpParcel
Parameters for bgpSessionData:
    local_port = integer    (default=179)
    remote_port = integer   (default=179)
    subinterface = integer  (default=0)
    prefix_length = integer (default=24)
    local_ip = ipv4_address (default=0.0.0.0)
    remote_ip = ipv4_address (default=0.0.0.0)
    server_port = integer   (default=0)
    server_ip = ipv4_address (default=0.0.0.0)
bgp4-1 bgpSessionData % gpfSetValues local_ip=192.1.1.2,
remote_ip=192.1.1.1, subinterface=100
0
bgp4-1 bgpSessionData % gpfPrintParcel
bgp4 Parcel, class=sessionData, 9 nodes - showing current rows only
Current node: 3 subinterface
    0 Set "bgpSessionData" 8 members: local_port (1), remote_port (2),
subinterface (3), prefix_length (4), local_ip (5), remote_ip (6),
server_port (7), server_ip (8)
    1   Value "local_port" = 179
    2   Value "remote_port" = 179
*  3   Value "subinterface" = 100
    4   Value "prefix_length" = 24
    5   Value "local_ip" = 192.1.1.2
    6   Value "remote_ip" = 192.1.1.1
    7   Value "server_port" = 0
    8   Value "server_ip" = 0.0.0.0
bgp4-1 bgpSessionData %
bgp4-1 bgpSessionData % gpfSendParcel Using a scripting language such as Tcl, it is possible to replicate functions performed by the protocol state machine 308n. In essence, the various protocol states would be defined using XML tags, and a set of Tcl procedures would be embedded in the definition 214n to process state changes. A decode services library can be provided to the Tcl interpreter for decoding an incoming PDU stream, along with an encode services library for encoding a PDU stream for transmit. Table 6 is an XML file that in conjunction with the appropriate Tcl functions, described in the remarks, may be used to mimic certain functions of a protocol state machine within the GPF 210.

TABLE 6

```
<?xml version="1.0" standalone="yes"?>
<EmulationSet xmlns="x-schema:AgtEmulSchema.xml" version="1"
providedBy="Agilent Technologies">
<!-- ~~~~~~~~~~~~~~~~~~~~~~~~~~~~~~ -->
<!--        Agilent Protocol Framework -->
<!-- ~~~~~~~~~~~~~~~~~~~~~~~~~~~~~~ -->
<!--  File type: protocol emulation -->
<!--  Content : MLD version 1 -->
<!-- ~~~~~~~~~~~~~~~~~~~~~~~~~~~~~~ -->
<!--  Copyright 2004 Agilent Technologies -->
<!-- ~~~~~~~~~~~~~~~~~~~~~~~~~~~~~~ -->
<filter name="ICMPv6_routerAlert">
    <!-- Hardware pattern matchers -->
    <!-- hop by hop option (for Router Alert) -->
    <hwMatch type="ipv6_emulation" offset="48" length="8" value="0"/>
    <!-- ICMPv6 -->
    <hwMatch type="ipv6_emulation" offset="320" length="8" value="58"/>
</filter>
<!-- EMULATION -->
<emulation name="MLDv1"
    standard="RFC 2710"
    protocols="IPv6 ICMP_v6"
    filter="ICMPv6_routerAlert">
    <!-- SESSION SUMMARY -->
    <parcel name="mldSessionSummary" type="data" class="sessionSummary">
        <value name="num_address_pools"
            fullName="Number of address pools"
            length="32"
            format="integer"/>
```

TABLE 6-continued

```
      <value name="num_addresses"
        fullName="Number of addresses"
        length="32"
        format="integer"/>
    </parcel>
    <!-- SESSION DATA -->
    <!-- Define the variables used by each emulation session -->
    <parcel name="mldSessionData" type="data" class="sessionData">
      <value name="tester_11_address"
        fullName="Tester IPv6 link-local address"
        length="128"
        defaultBinding="tester_native_ipv6_11_address"
        format="ipv6_address"/>
      <value name="sub_interface"
        fullName="Sub-interface identifier"
        length="32"
        defaultValue="0"
        format="integer"/>
      <value name="robustness"
        fullName="Robustness variable"
        length="16"
        format="integer"
        defaultValue="2"/>
      <value name="queryResponseInterval"
        fullName="Query response interval (mSec)"
        length="32"
        format="integer"
        defaultValue="10000"/>
      <value name="unsolicitedReportInterval"
        fullName="Query response interval (mSec)"
        length="32"
        format="integer"
        defaultValue="10000"/>
    </parcel>
    <!-- TOPOLOGY SUMMARY -->
    <parcel name="mldTopologySummary"
      fullName="MLD Topology summary"
      class="topologySummary">
      <use ref="mldSessionData:tester_11_address"/>
      <use ref="mldSessionData:sub_interface"/>
    </parcel>
    <!-- TOPOLOGY DATA -->
    <parcel name="poolList"
      fullName="Multicast address pools"
      class="topologyData">
      <parcel ref=":destinationPools"/>
    </parcel>
    <!-- STATISTICS -->
    <!-- Any statistics defined here are additional to the pre-defined
statistics -->
    <parcel name="mldStats" class="statistics"
      fullName="MLD Version 1 Statistics">
      <value name="ReportMessagesSent"
        fullName="Outgoing MLD Report messages count"
        type="count"
        length="32"
        format="integer"/>
      <value name="DoneMessagesSent"
        fullName="Outgoing MLD Done messages count"
        type="count"
        length="32"
        format="integer"/>
      <value name="QueryMessagesReceived"
        fullName="Incoming MLD Query messages count"
        type="count"
        length="32"
        format="integer"/>
      <value name="ReportMessagesReceived"
        fullName="Incoming MLD Report messages count"
        type="count"
        length="32"
        format="integer"/>
      <value name="MulticastAddressCount"
        fullName="Number of active multicast addresses"
        type="count"
        length="32"
        format="integer"/>
    </parcel>
    <!-- BINDINGS -->
```

TABLE 6-continued

```
<bind name="mldSocket">
   socket Type="subinterface"
   subInterface="$sub_interface"
   filter="ICMPv6_routerAlert">
   <importPdu protocol="IPv6" packetType="">
      <decodeMatch pdu="mldQuery"
         protocol="ICMPv6"
         protocolInstance="1"
         field="mld_query_v1"
         statistic="QueryMessagesReceived"
         proc="onMldQuery"/>
      <decodeMatch pdu="mldReport"
         protocol="ICMPv6"
         protocolInstance="1"
         field="mld_report_v1"
         statistic="ReportMessagesReceived"
         proc="onMldReport"/>
   </importPdu>
</bind>
<tclProc name="onMldQuery">
   set multicastAddress [value [findElement ICMPv6 multicast_address 1]]
   aebLog info "MLD Query message received for address: [formatValue
$multicastAddress ipv6_address]"
   # notify the state machine of the incoming packet. Notification will
be dropped
   # if no instance is present for $multicastAddress
   aebNotify mld_listener $multicastAddress query_received
</tclProc>
<tclproc name="onMldReport">
   set multicastAddress [value [findElement ICMPv6 multicast_address 1]]
   aebLog info "MLD Report message received for address: [formatValue
$multicastAddress ipv6_address]"
   # notify the state machine of the incoming packet. Notification will
be dropped if no
   # instance is present for $multicastAddress
   aebNotify mld_listener $multicastAddress report_received
</tclProc>
<!-- COMMANDS -->
<command name="join"
   fullName="Join a set of multicast addresses"
   proc="join">
   <parcel ref="poolList"/>
</command>
<command name="leave">
   fullName="Leave a set of multicast addresses"
   proc="leave"/>
   <parcel ref="poolList"/>
</command>
<command name="leaveAll">
   fullName="Leave all multicast addresses"
   proc="leaveAll"/>
</command>
<command name="listPools">
   fullName="List all multicast pools"
   proc="listPools"
   event="poolList"/>
<!-- SESSION PRIVATE DATA -->
<value name="allRoutersMcastAddress">
   fullName="All routers multicast address"
   length="128"
   format="ipv6_address"
   value="0xff02 0000 0000 0000 0000 0000 0000 0001"/>
<!-- PDU TEMPLATES -->
<pduTemplate name="reportPdu" protocol="" packetType="MLD"
proc="createReportPdu"/>
<pduTemplate name="donePdu" protocol="" packetType="MLD"
proc="createDonePdu"/>
<tclProc name="createReportPdu">
   set eIcmp [findProtocol "ICMP_v6" 1]
   setContainedElements $eIcmp mld_report_v1
   set eSrcAddr [findElement "IPv6 source_address 1"]
   setValue $eSrcAddr $tester_11_address
</tclProc>
<tclProc name="createDonePdu">
   set eIcmp [findProtocol "ICMP_v6" 1]
   setContainedElements $eIcmp mld_done
   set eSrcAddr [findElement "IPv6 source_address 1"]
   set eDstAddr [expr $eSrcAddr + 1]
   setValue $eSrcAddr $tester_11_address
```

TABLE 6-continued

```
      setValue $eDstAddr $allRoutersMcastAddress
   </tclProc>
   <!-- COMMAND IMPLEMENTATIONS -->
   <tclProc name="join" packet="poolList">
      # Check whether this is a new pool or a changed pool
      if {[packetChanged "poolList"]} {
         # Existing pool - delete the old one first
         leave
      }
      # Create the new pool
      set poolFirstAddr($handle)     $firstAddr
      set poolModifier($handle)      $modifier
      set poolCount($handle)         $count
      for {set i 0} {$i < $count} {incr i} {
         set addr [aebCalculateIpv6Address $firstAddr $modifier $i]
         if {[info exists stateMachineRefCount($addr)]} {
            incr stateMachineRefCount($addr)
         } else {
            set stateMachineRefCount($addr) 1
            aebCreate mld_listener $addr
         }
      }
   </tclProc>
   <tclProc name="leave" parameters="handle">
      if {[info exists $poolFirstAddr($handle) == 0} {
         aebLog error "Leave command for unknown handle $handle"
      } else {
         aebLog info "Leaving pool $handle"
         for {set i 0} {$i < $poolCount($handle)} {incr i} {
            set addr [aebCalculateIpv6Address $poolFirstAddr($handle)
$poolModifier($handle) $i]
            if {[info exists stateMachineRefCount($addr)} {
               incr stateMachineRefCount($addr) -1
               if {stateMachineRefCount($addr) == 0} {
               aebNotify mld_listener $addr stop_listening
                  unset stateMachineRefCount($addr)
               }
            }
         }
      }
   </tclProc>
   <tclProc name="leaveAll">
      foreach handle [array names $poolFirstAddr] {
         leave $handle
      }
   </tclProc>
   <tclProc name="listAddresses">
      aebCreatePacket poolList
      foreach handle [array names $poolFirstAddr] {
         aebAppendList pool_list {$handle $poolFirstAddr($handle)
$poolModifier($handle) $poolCount($handle)}
      }
      aebSendEvent poolList
   </tclProc>
   <!-- STATE MACHINE -->
   <stateMachine name="mld_listener">
      createProc="listenToAddress"
      createParameter="multicast_address"
      firstState="delaying_listener">
      <!-- State machine variables (maintained by framework for each state
machine instance) -->
      <value name="smMulticastAddress" fullName="Multicast Address"
format="ipv6_address"/>
      <value name="smActiveFlag" defaultValue="1"/>
      <value name="smDelayTimeout"
defaultValue="$unsolicitedReportInterval"/>
      <!-- State definitions -->
      <state name="delaying_listener">
         <onEntry>
            <startTimer name="delay_timer" minTimeout="0"
maxTimeout="$smDelayTimeout" expireAction="timer_expire"/>
            <tclEval "set smDelayTimeout $queryResponseInterval">
         </onEntry>
         <action name="stop_listening"
            fullName="Stop listening to a multicast address"
            proc="sendDoneIfActive"
            newState="aebDestroyInstance"/>
         <action name="report_received"
            fullName="Report for this address received from another node"
            newState="idle_listener"
```

TABLE 6-continued

```
            pdu="mldReport">
            <tclEval "set smActiveFlag 0"/>
            <stopTimer name="delay_timer"/>
         </action>
         <action name="timer_expire"
            fullName="Delay timer expired"
            proc="sendReport"
            newState="idle_listener">
            <tclEval "set smActiveFlag 1"/>
         </action>
         <action name="query_received"
            fullName="Query received from router"
            proc="conditionalResetTimer">
         </action>
      </state>
      <state name="idle_listener">
         <action name="query_received"
            fullName="Query received from router"
            newState="delaying_listener">
         <action name="stop_listening"
            fullName="Stop listening to a multicast address"
            proc="sendDoneIfActive"
            newState="aebDestroyInstance"/>
      </state>
      <!-- State machine procedures -->
      <tclProc name="listenToAddress" parameters="multicast_address">
         set smMulticastAddress $multicast_address
         sendReport
      </tclProc>
      <tclProc name="sendReport">
         copyPdu reportPdu
         set eDstAddr [findElement "IPv6 destination_address 1"]
         # report messages are sent to the address being reported
         setValue $eDstAddr $smMulticastAddress
         set eMrd [findElement ICMPv6 max_response_delay 1]
         set eAddr [expr $eMrd + 2] ;# mcastAddress is 2nd field past mrd
         setValue $eMrd $smDelayTimeout
         setValue $eAddr $smMulticastAddress
         aebSendPdu mldSocket
         aebLog info "MLD report sent for [formattedvalue $addrelem]"
         aebIncrementStatistic ReportMessagesSent
      </tclProc>
      <tclProc name="sendDoneIfActive">
         if {$smActiveFlag == 0} { return }
         copyPdu donePdu
         set eMrd [findElement ICMPv6 max_response_delay 1]
         set eAddr [expr $eMrd + 2] ;# mcastAddress is 2nd field past mrd
         setValue $eMrd $smDelayTimeout
         setValue $eAddr $smMulticastAddress
         aebSendPdu mldSocket
         aebLog info "MLD done sent for [formattedvalue $addrelem]"
         aebIncrementStatistic DoneMessagesSent
      </tclProc>
      <tclProc name="conditionalResetTimer">
         # Current pdu is an mld query - retrieve the max response
         set maxResponse [value [findElement ICMPv6 max_response_delay 1]]
         aebLog info "Received MLD query max response = $maxResponse"
         if {$maxResponse == 0 || [aebGetTimer delay_timer] <
$maxResponse} {
            aebExpireTimer delay_timer ;# will trigger timer action
         }
      </tclProc>
   </stateMachine>
</emulation>
<!-- ===================================================================== --
>
</EmulationSet>
```

Tcl scripts can be created that provide simple emulation and conformance testing. The emulation housing 308n is configured to pass through protocol packets received by the port to the control of the Tcl API 312. Similarly, the emulation housing 308n may be configured to pass through the network under test protocol packets generated by the Tcl API 312. The Tcl API 312 can be configured to interface with packet building software such as that disclosed in U.S. patent application Ser. No. 10/266,507, Publication No.: US20040068681 A1. Alternatively, certain concepts of the present invention can be extended to the protocol state machine by making the state machine configurable based on definitions similar in format to the protocol emulation definitions 214.

GUI

In perhaps the preferred embodiment, the GUI 310 is constructed in a generic manner wherein the layout of elements on the display is responsive to the structure of the message reference models and objects. Referring to FIG. 3, the GUI 310 is driven using the protocol emulation definitions 214n in that for each piece of data to be displayed, attributes may be created that describe how such display is to be formatted. Similarly, in instances where input is required from the user, attributes of the data element for which such input is sought may be used to format the display seeking such input. Perhaps advantageously, the GUI 310 will have pre-designed and built dialogs for each major functional block of data. The formatting of the display of each block will vary by implementation; however, it may prove advantageous to provide each block with its own window. The specific content of the GPF dialogs (fields, columns etc) will be populated by the data received.

One example of a suitable list of major functional blocks includes: session manager, session editor, topology editor, session statistics, session log, and message trace. The session manager block could include data for the creation, deletion, enabling and disabling of sessions, along with views of session status and summary information. The session editor block could include data for the creation, viewing, and editing of session global data, such as SUT addresses, options and timers. The topology editor block could include data for the creation of viewing of session topology, such as simulated routes or routers. The topology editor block may also include functionality for the sending of commands or the injection of PDUs into the emulation session. The session statistic block could provide a view of real-time statistics particular to each session type. The session log block could provide a view of an event message log generated by each session. Lastly, the message trace block could provide a view of a live message trace of messages sent and received by each session.

Protocol Emulation Definition

Figure 7:
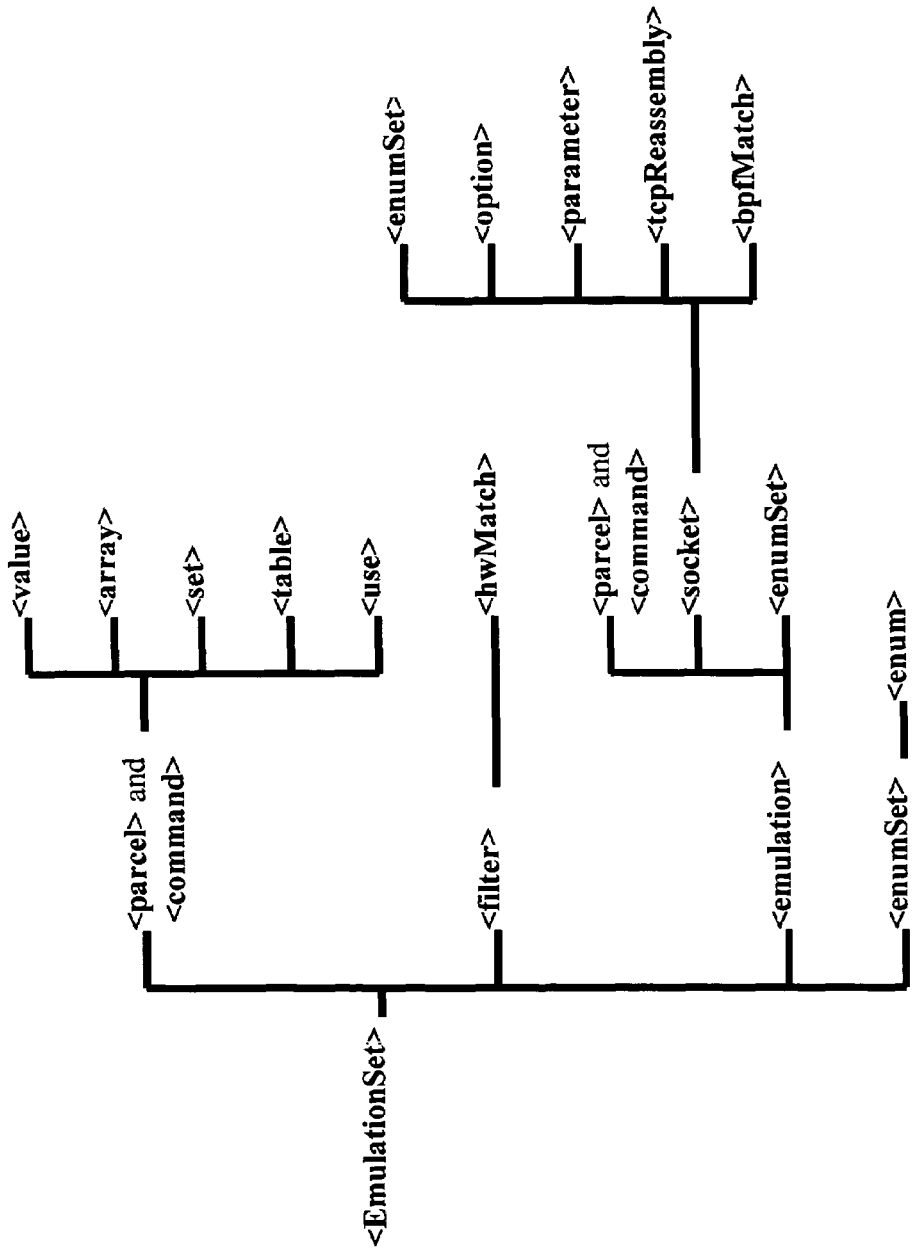
FIG. 7 is diagram of an XML tag hierarchy for use in a generic protocol framework in accordance with embodiments of the present invention.

Perhaps the underlying concept of embodiments of the present invention is the use of protocol emulation definitions logically external to the GPF 210. FIG. 7 is diagram of an XML tag hierarch suitable for use in a generic protocol framework in accordance with embodiments of the present invention. In accordance with certain embodiments of the present invention, reference models are formed based upon protocol emulation definition files using the XML tag hierarch set forth in FIG. 7. While protocol emulation definitions are described as being formatted in XML, those of ordinary skill in the art will recognize that other formats may be used. More specifically, it is desirable to format the protocol emulation description in an easily accessible format to facilitate creation and modification thereof.

The preferred data structure of a file is hierarchical, wherein each node can contain a value, sub nodes, a function, an array of values or a table of values. The nested tag structure provided by XML facilitates the documentation of hierarchal relationships and table structures. A message definition may be as simple as a text file that provides a list of functional units and specifies the elements (referred to herein as the "nodes") that comprise each functional unit, the type of each node and the interrelationship of the nodes. Each node may be annotated using descriptive attributes (examples of which are discussed herein after).

Each section of an emulation definition file may comprise a header and a set of elements. Elements generally fall into two categories, container elements that provide structure and data elements that store a value or series of values. XML tags may be used to organize the headers and elements. For example, the data and commands required for a single type of protocol emulation may be encapsulated within an <emulationset> tag. Within the <emulationset> tags, the elements may be further organized based upon their function. Looking at FIG. 7, one possible organization scheme is shown wherein the elements are encapsulated using the following tags: <parcel>, <command>, <filter>, <emulation>, and <enumset>.

The form and format of the <parcel> section is discussed in co-pending U.S. patent application #10/851,303. The <command> section follows the same basic format as the <parcel> section. An example of a set of element types for a <parcel> message segment are shown in TABLE 7.

TABLE 7

| Element Type | Container | Description |
| --- | --- | --- |
| value | No | A single value. (Boolean, Numeric or string). A value may be any length. |
| array | No | A set of homogeneous values (all the same type) |
| set | Yes | A parcel element containing other parcel elements, e.g. value, array, set, table or keyed table. |
| table | Yes | A table. Each member of the table represents a column. Rows in the table are indexed. |
| keyed table | Yes | A table. Each member of the table represents a column. One column, which must be a value, is specified as the key column. Each row in the table must have a unique value in the key column. Rows are accessed by key value. |

The commands used by the API may also be defined using XML definitions. This may be achieved by adding a level of indirection, so that instead of the API having many hundreds of protocol specific commands, just a few general commands are provided by the API itself. For example, the commands described in Table 8 represent a minimalist set of commands that permit the user to identify and invoke the commands defined in a protocol definition.

TABLE 8

| Command | Parameters | Purpose |
| --- | --- | --- |
| listCommands | Emulation name or blank | List the commands available for the emulation, or if no emulation is specified, list the global commands |
| help | Command name | Display help information about the command |
| invoke | XML defined command and parameters | Invoke a command |

The commands provided for each emulation may defined in the protocol emulation definition 214n. For example see Table 9:

TABLE 9

```
<command name="setKeepalive" fullName="Set the value of the Keep
alive timer">
    <value name="keepalive" fullName="Keepalive Value" length="16"
    defaultValue="100"/>
</command>
```

In this simple case, the required parameters are defined as one or more values. In other situations, it is useful to define the command parameters as a table row in a parcel, e.g. see Table 10:

TABLE 10

```
<command name="advertise" fullName="Advertise route pool">
    <use rowRef="routePools"/>
</command>
```

For this example, we can assume that we have defined a parcel called "routePools", which is a table for which each row represents an individual route pool. The command "advertise" operates on a route pool, and we associate the two using the "rowRef" attribute.

This style of command is very useful for the GUI, as it allows the user to select a row in the route pool tables and click "advertise". The command definition allows the appropriate command and parameters to be automatically associated.

One possible implementation for the <filter> section is discussed in co-pending U.S. application Ser. No. 10/861, 618. In one embodiment a single tag <hwMatch> is defined for the <filter>. As filters are generally formatted as predefined bit streams, the <hwMatch> contains a bitstream (either in binary or hex) corresponds directly to the implemented emulation matchers. By way of example, the <hwMatch> parameters for the AGILENT ROUTERTESTER 900 are the IP protocol id and the first 32 bits of the IP payload, along with associated masks. In summary, the payload of the <hwMatch> tag simply contains the data needed to program the hardware interface.

The emulation> section contains the <socket> and <parcel> tags pertaining to a specific protocol emulation. The <emulation> may also make reference to one or more filters defined externally to the <emulation>.

TABLE 11 contains a sample set of element types for a <socket> message segment.

TABLE 11

| Element Type | Description |
| --- | --- |
| Enumset | Table of name/value pairs - see description below. |
| option | Defines a socket option. All standard TCP/IP socket options are supported |
| parameter | specify a parameter used to configure the socket. Example parameters include: localPort, remotePort, localAddress, remoteAddress, subInterface, prefixLength and protocol. Different socket types (eg BPF, Raw or TCP client) have different requirements as to which parameters are mandatory. Parameter values may be specified statically in the XML, or may reference a value in the sessionData parcel. |
| tcpReassembly | A TCP socket provides a streaming interface. Most applications require the TCP payload to be assembled into discrete packets, identified by a length field embedded in the data. This tag is used to program a TCP reassembly routine for performing this operation. |
| bpfMatch | The BPF socket is a generic layer 2 socket that selects packets using the industry standard "Berkeley Packet Filter" software matcher. Traditionally, BPF filters are hardcoded by embedded software. In the GPF, the <bpfMatch> tags provide a simple XML interface for programming the BPF filter from the emulation definition. |

Table 12 contains a segment of a protocol emulation definition that illustrates <filter> and <socket> sections.

TABLE 12

```xml
<?xml version="1.0" standalone="yes"?>
<EmulationSet version="1" providedBy="Agilent Technologies">
<!-- Copyright 2004 Agilent Technologies -->
<!-- ======================================================================== -->
<!-- Note: protocolMask defaults to 0xFF, dataMask defaults to 0xFFFFFFFF -->
<filter name="bgp4_filter">
   <hwMatch type="ipv4" protocolValue="6" dataValue="0xb3" dataMask="0xffff"/>
   <hwMatch type="ipv4" protocolValue="6" dataValue="0xb30000" dataMask="0xffff0000"/>
   <hwMatch type="ipv6" protocolValue="6" dataValue="0xb3" dataMask="0xffff"/>
   <hwMatch type="ipv6" protocolValue="6" dataValue="0xb30000" dataMask="0xffff0000"/>
</filter>
<filter name="isis_filter">
   <hwMatch type="bpf"/>
</filter>
<emulation name="bgp4" filters="bgp4_filter" >
   <socket name="clientSkt" id="1" type="tcp" role="client" instance="session">
      <tcpReassembly offset="128" length="16" lengthMultiplier="8"/>
            <option name="so_linger" value="0"/>
            <option name="so_reuseaddr" value="0"/>
            <option name="ip_ttl" value="1"/>
            <option name="ip_tos" value="64"/>
            <parameter name="local_ip" purpose="local_address"
valueRef="bgpSessionData:local_ip"/>
            <parameter name="remote_ip" purpose="remote_address"
valueRef="bgpSessionData:remote_ip"/>
            <parameter name="remote_port" purpose="remote_port"
valueRef="bgpSessionData:remote_port"/>
            <parameter name="subinterface" purpose="subinterface"
valueRef="bgpSessionData:subinterface"/>
            <parameter name="prefix_length" purpose="prefix_length"
valueRef="bgpSessionData:prefix_length"/>
   </socket>
   <socket name="serverSkt" id="2" type="tcp" role="server" instance="global">
            <option name="so_linger" value="0"/>
            <option name="so_reuseaddr" value="0"/>
            <parameter name="local_port" purpose="local_port"
valueRef="bgpSessionData:local_port"/>
         </socket>
   <packet name="bgpSessionData" class="sessionData">
      <value name="local_port"
         fullName="Local port"
         length="16"
         format="integer"
         defaultValue="179"
         writable="no"/>
      <value name="remote_port"
         fullName="Remote port"
         length="16"
         format="integer"
         defaultValue="179"
         writable="no"/>
      <value name="subinterface"
         fullName="Sub-interface identifier"
         length="32"
         format="integer"/>
      <value name="prefix_length"
         fullName="Address prefix length"
         format="integer"
         length="32"
         defaultValue="24"/>
      <value name="local_ip"
         fullName="Source IP Address"
         format="ipv4_address"
         length="32"
         initialise="required"/>
      <value name="remote_ip"
         fullName="Destination IP Address"
         format="ipv4_address"
         length="32"
         initialise="required"/>
   </packet>
</emulation>
<emulation name="isis" filters="isis_filter">
         <socket name="tx" type="bpf" instance="subinterface">
<!-- By default bpf will drop all incoming packets -->
```

TABLE 12-continued

```
                <parameter name="subinterface" purpose="subinterface"
    valueRef="isisSessionData:subinterface"/>
            </socket>
            <socket name="L1_rx_broadcast" type="bpf" instance="subinterface">
                <bpfMatch program="offsetMatch" offset="0" length="48"
    matchRef="isisSessionData:L1_mac_address">
                    <bpfMatch program="offsetMatch" offset="112" length="16" match="0xFEFE"/>
                </bpfMatch>
                <parameter name="subinterface" purpose="subinterface"
    valueRef="isisSessionData:subinterface"/>
            </socket>
            <socket name="L2_rx_broadcast" type="bpf" instance="subinterface">
                <bpfMatch program="offsetMatch" offset="0" length="48"
    matchRef="isisSessionData:L2_mac_address"/>
                    <bpfMatch program="offsetMatch" offset="112" length="16" match="0xFEFE"/>
                <parameter name="subinterface" purpose="subinterface"
    valueRef="isisSessionData:subinterface"/>
            </socket>
            <socket name="rx_ptop" type="bpf" instance="subinterface">
                <bpfMatch program="offsetMatch" offset="16" length="16" match="0x0023">
                    <bpfMatch program="offsetMatch" offset="32" length="8" match="0x83"/>
                    <bpfMatch program="offsetMatch" offset="32" length="8" match="0x82"/>
                </bpfMatch>
                <parameter name="subinterface" purpose="subinterface"
    valueRef="isisSessionData:subinterface"/>
            </socket>
            <packet name="isisSessionData" class="sessionData">
        <value name="subinterface"
            fullName="Sub-interface identifier"
            length="32"
            format="integer"/>
        <value name="L1_mac_address"
            fullName="L1 Destination MAC address"
            format="mac_address"
            length="48"
            defaultValue="0x0180C2000014"
                writable="no"/>
                <value name="L2_mac_address"
                    fullName="L2 Destination MAC address"
                    format="mac_address"
                    length="48"
                    defaultValue="0x0180C2000015"
                    writable="no"/>
    </packet>
  </emulation>
</emulationSet>
```

An <enumSet> is a table of name/value pairs, and is used to map meaningful names to specific values or value ranges. This is especially useful for GUI presentation of certain data, where raw values are better presented alongside a meaningful value. Additionally, the enumSet concept can be extended to allow parcels or parcel values to reference each other based on a particular value. An example of an <enum> set is shown in Table 12.

TABLE 12

```
<enumSet name="Topology Types">
    <enum value="1" name="Route Pool" parcelRef="RoutePool"/>
    <enum value="2" name="Grid"      parcelRef="Grid"/>
    <enum value="2" name="Ring"      parcelRef="Ring"/>
</enumSet>
```

Here a specific value, e.g. "1" is mapped to a name "Route Pool", and also to a parcel. This could be used in a GUI, where for example a summary table of topology items is listed. When the user selects a row in the table, he will see detailed data extracted from the parcel referenced according to the topology type.

Each element in a may be annotated using descriptive attributes. Such attributes document the element, allowing the message definition to be self-documenting. By storing the attributes with the message definition and perhaps the message reference model, the routines provided to manipulate and interface with messages may be generic in nature, e.g. the data structure is not coded in the routines, rather the data structure is provided during run-time. For example, attributes can be used to provide all the information needed to present and edit any message or segment using a generic graphical user interface. Some examples of possible attributes are shown in Table 13. Those of ordinary skill in the art will recognize that the list present in table 2 is not exhaustive—other attributes may prove beneficial depending on the implementation of the present invention.

TABLE 13

| Attribute | Purpose |
| --- | --- |
| fullName | GUI presentation name for the parcel element |
| description | Description of purpose and usage |
| length | For value and array elements, the length attribute defines the number of bits required to hold the value. |
| format | The presentation format. Defined formats include "integer", "hex", "Boolean", "ipv4_address" etc. |
| minValue/ maxValue | Allowed value ranges, allowing the GUI or API to perform automated range checking |

By way of example, Table 14 contains an example of a protocol emulation definition in XML. In particular, Table 14 contains a sample bgp4 definition file.

TABLE 14

```
<?xml version="1.0" standalone="yes"?>
<EmulationSet version="1" providedBy="Agilent Technologies">
<!-- Copyright 2004 Agilent Technologies -->
<!--
===================================================
-->
<filter name="bgp4_filter">
    <hwMatch type="ipv4" protocolValue="6" dataValue="0xb3" dataMask="0xffff"/>
    <hwMatch type="ipv4" protocolValue="6" dataValue="0xb30000" dataMask="0xffff0000"/>
    <hwMatch type="ipv6" protocolValue="6" dataValue="0xb3" dataMask="0xffff"/>
    <hwMatch type="ipv6" protocolValue="6" dataValue="0xb30000" dataMask="0xffff0000"/>
</filter>
<!--
===================================================
-->
<emulation name="bgp4"
    shortName="BGP4"
    fullName="BGP4 emulation"
    standard="RFC 1771"
    description="Sample BGP4 emulation description"
    filter="bgp4_filter" >
    <socket name="clientSkt" type="tcpClient" instance="session">
        <option name="soLinger" value="0"/>
        <option name="soReuseaddr" value="0"/>
        <option name="ipTtl" value="1"/>
        <option name="ipServiceOctet" value="64"/>
            <parameter purpose="localAddress" valueRef="bgpSessionData:local_ip"/>
            <parameter purpose="remoteAddress" valueRef="bgpSessionData:remote_ip"/>
            <parameter purpose="remotePort" valueRef="bgpSessionData:remote_port"/>
            <parameter purpose="subinterface" valueRef="bgpSessionData:subinterface"/>
            <parameter purpose="prefixLength" valueRef="bgpSessionData:prefix_length"/>
        <tcpReassembly offset="128" length="16" lengthMultiplier="8"/>
    </socket>
    <socket name="serverSkt" type="tcpServer" client="clientSkt" instance="global">
        <option name="soLinger" value="0"/>
        <option name="soReuseaddr" value="0"/>
        <parameter purpose="localPort" valueRef="bgpSessionData:local_port"/>
        <parameter purpose="localAddress" valueRef="bgpSessionData:local_ip"/>
        <parameter purpose="subinterface" valueRef="bgpSessionData:subinterface"/>
    </socket>
    <parcel name="bgpSessionData"
        fullName="BGP4 Session Data"
        class="sessionData"
        flow="toServer"
        buffer="newest">
        <value name="local_port"
            fullName="Local port"
            purpose="localPort"
            length="16"
            format="integer"
            defaultValue="179"/>
        <value name="remote_port"
            fullName="Remote port"
            purpose="remotePort"
            length="16"
            format="integer"
            defaultValue="179"/>
        <value name="subinterface"
            fullName="Sub-interface identifier"
            purpose="subinterface"
            length="32"
```

TABLE 14-continued

```
            format="integer"/>
        <value name="prefix_length"
            fullName="Address prefix length"
            format="integer"
            purpose="prefixLength"
            length="32"
            defaultValue="24"/>
        <value name="local_ip"
            fullName="Source IP Address"
            format="ipv4_address"
            purpose="localAddress"
            length="32"/>
        <value name="remote_ip"
            fullName="Destination IP Address"
            format="ipv4_address"
            purpose="remoteAddress"
            length="32 "/>
        <value name="server_port"
            fullName="Server TCP Port"
            format="integer"
            purpose="localPort"
            length="16"/>
        <value name="server_ip"
            fullName="Server IP Address"
            format="ipv4_address"
            purpose="localAddress"
            length="32"/>
    </parcel>
    <parcel name="routeSummary"
        class="topologySummary"
        buffer="newest">
        <value name="v4Pools"
            fullName="Number of IPv4 Pools"
            format="integer"/>
        <value name="v4Addresses"
            fullName="Number of IPv4 Addresses"
            format="integer"/>
        <value name="v6Pools"
            fullName="Number of IPv6 Pools"
            format="integer"/>
        <value name="v6Addresses"
            fullName="Number of IPv6 Addresses"
            format="integer"/>
    </parcel>
    <enumSet name="poolState" fullName="Route Pool State">
        <enum value="0" name="Withdrawn"/>
        <enum value="1" name="Advertised"/>
    </enumSet>
    <parcel name="routePools"
        fullName="Route Pools"
        class="topologyData"
        buffer="fetch">
        <table name="ipv4Pools"
            fullName="IPv4 Route Pools">
            <value name="v4StartAddr"
                fullName="Start Address"
                length="32"
                format="ipv4_address"/>
            <value name="v4PrefixLen"
                fullName="Prefix Length"
                minValue="1"
                defaultValue="24"
                maxValue="32"/>
            <value name="v4Count"
                fullName="Count"/>
            <value name="state"
                fullName="State"
                length="1"
                enumRef="poolState"/>
        </table>
        <table name="ipv6Pools"
            fullName="IPv6 Route Pools">
            <value name="v6StartAddr"
                fullName="Start Address"
                length="128"
                format="ipv6_address"/>
            <value name="v6PrefixLen"
                fullName="Prefix Length"
                minValue="1"
```

TABLE 14-continued

```
            defaultValue="64"
            maxValue="128"/>
        <value name="v6Count"
            fullName="Count"/>
        <value name="state"
            fullName="State"
            length="1"
            enumRef="poolState"/>
    </table>
</parcel>
<command name="advertise">
    <use rowRef="routePools:ipv4Pools"/>
    <use rowRef="routePools:ipv6Pools"/>
</command>
<command name="withdraw">
    <use rowRef="routePools:ipv4Pools"/>
    <use rowRef="routePools:ipv6Pools"/>
</command>
<parcel name="statistics"
        class="statistics"
        buffer="newest">
    <value name="OpenTx"
        fullName="Transmitted Open messages"/>
    <value name="OpenRx"
        fullName="Received Open messages"/>
    <value name="UpdateTx"
        fullName="Transmitted Update messages"/>
    <value name="UpdateRx"
        fullName="Received Update messages"/>
    <value name="KeepAliveTx"
        fullName="Transmitted KeepAlive messages"/>
    <value name="KeepAliveRx"
        fullName="Received KeepAlive messages"/>
    <value name="NotificationTx"
        fullName="Transmitted Notification messages"/>
    <value name="NotificationRx"
        fullName="Received Notification messages"/>
</parcel>
</emulation>
<!--
================================================== -
-->
</EmulationSet>
```

Often default values for elements need to be set which vary according to other values specified internally or externally of the definition. In such cases it may be beneficial to integrate Tool Command Language (TCL) procedures that can be invoked to perform such tasks. Such function can be specified in the protocol emulation definition files. Integration of TCL is within the capabilities of those of ordinary skill in the art and as such the specific details of such integration will not be discussed herein. An example of a portion of a parcel definition incorporating TCL functions is shown in Table 15:

TABLE 15

```
<value name="holdTimer" fullName="Hold Timer" length="16"
    defaultValue="30"/>
<value name="keepalive" fullName="Keepalive Value" length="16"
    valueFunction="multiply :holdTimer 2" />
```

In this example, the default value for keepalive is maintained at twice the holdTimer, no matter what value is set for holdTimer. The TCL functions can be executed when instantiating a parcel, e.g. creating an instance of a parcel. Further, routines can be created to review the message definition and/or model and update the values affected by such functions during runtime.

Referring to FIG. 3, the protocol emulation definitions may be stored on the host 302 and retrieved at run time by the emulation control 304. Similarly, any remote process (such as the ports 306$n$, the GUI 310, and the Tcl API 312) that communicates with the host 302 may be provided with the copies of the protocol emulation definitions.

At run-time, the protocol emulation definitions are parsed to create reference models. In general, the reference model is a data structure, such as in $C^{++}$. The reference model serves two functions. The first function is to hold data that is referenced by the various functional elements of the system. The second function is to serve as a model for the creation of parcels used to communicate data to and from the emulation control 304. Such parcels may comprise instances of a protocol emulation definition or one or more segments thereof. Perhaps the closest analogous structure to a reference model would be a generic type in $c^{++}$. One difference is that while generic types must be defined at compile, a reference model can be introduced during run time. In at least one embodiment of the present invention, the reference model from which parcels are derived defines the type. In use, it may prove beneficial to parse all protocol emulation definitions at system startup so as to generate a reference model of all potential parcels that may be required during operation. However, if time and storage are considerations, it may be advisable to generate only those reference models that are likely to be needed for the current session.

Each major element of the GPF 210 (e.g. the emulation control 304, the emulation housings 306$n$, and the proxy controls 314$n$) should have a copy of the protocol emulation definitions 214. This may be accomplished by providing the protocol emulation definitions 214 to one element, typically the emulation control 304, and subsequently distributing copies to the other elements. One manner in which this can be accomplished is to manually provide each element of the GPF 210 with a bootstrap definition file that enables the configuration and operation of the parcel stores. Thereafter, upon system initialization, the parcel stores can be used to transmit the current set of protocol emulation definitions files 214 by encapsulating them in a parcel and transmitting them using the parcel stores 402$n$.

Parcel Link

As stated hereinabove, communication to and from the emulation control 304 preferably occurs via a pre-defined messaging format based on the concept of parcels as described in co-pending U.S. patent application #10/851,303. The parcels may be transmitted using the concept of a parcel link 424 (see FIG. 4).

The parcel link 424 may comprise a simple interface that simply sends and receives byte strings making it straightforward to implement over a serial interface if required, or any type of network. The physical implementation details should be transparent to the GPF and further discussion will be dispensed with.

One method for transmitting parcels is to serializing the data in the parcel by extracting the data from the structure. Enough data structure should be provided to identify the reference model (or portion thereof) that can be used to decode the binary stream and recreate the parcel on the receiving side. During this reconstruction, the structural information contained in the reference model maybe used to parse the data in the binary stream. Accordingly, the recipient of the serialized message should be provided with a copy of the appropriate message definitions. The recipient must parse the message definition to generate a reference model, which should be a copy of the reference model 204$a$. Upon receipt of the serialized message, the recipient forms a message object by instantiating the reference model (or portion thereof) and populates the resultant data structure with the binary data thereby re-creating the message object.

Table 16 is a portion of self-documenting C++ code describing a communication link suitable for use in transmitting messages in accordance with embodiments of the present invention.

TABLE 16

```
#ifndef APF__PARCEL__LINK__H
#define APF__PARCEL__LINK__H
// =====================================================
//
// = LIBRARY
//     APF Agilent Protocol Framework
//
// = FILENAME
//     ApfParcelLink.h
//
// = DESCRIPTION
//
// Interface linking one parcel store with another.
//
// = AUTHORS
//     Geoff Smith
//
// = COPYRIGHT
//     (C) Copyright 2004 Agilent Technologies
//
// =====================================================
#include "acl/acl.h"
#include "acl/afc/afc.h"
#include "pdubuilder/include/apbExport__.h"
//---------------------------------------------------------------------
// = TITLE
//     Parcel Link
//
// = CLASS TYPE
//     Interface
//
// = DESCRIPTION
// Interface linking one parcel store with another. Proxies and Stubs for
// this interface may be implemented by intervening system layers outside
// of the GPF for linking GPF parcel stores residing on different platforms.
//
// Implementation of this interface is provided by the parcel store at each
// end of a link. Note that each parcel store both provides and uses an
// implementation of this interface to communicate with another
parcel store.
class APB__EXPORT__CLASS IApfParcelLink
{
public:
    // = FOUNDATION
    virtual ~IApfParcelLink( ) { }
        virtual void
    parcelData(uint32__t aPort,
        uint32__t aSession,
        const AtoString& aName,
        const AtoByteString& aParcel) = 0;
};
#endif // APF__PARCEL__LINK__H
```

CONCLUSION

Ultimately, the present invention realizes the possibility of generic protocol emulations, where entire protocol emulations can be defined in XML and Tcl to run within the framework. This would empower customers and technical support engineers with the ability to test new protocols immediately without waiting for the supplier to deliver the protocol module. Such a generic emulation would appear identical to the API and GUI as an inbuilt emulation, although there may be performance limitations. However, the time-to market window is addressed, providing the opportunity to follow up with a high performance in-built emulation solution if required. A standalone framework easily deployable in a variety of target platforms. Protocol modules can be developed and tested in a self-contained GPF environment, and deployed on whatever platform the GPF is deployed. The GPF can be easily deployed in a variety of target platforms or even distributed environments due to the flexible star-wired nature of the three GPF components, and the very simple, asynchronous parcel-Link API that is used to connect the components together.

What is claimed is:

1. A protocol emulation system comprising:
   at least one emulation housing configured by a protocol emulation definition for initiating protocol emulation sessions in accordance with data contained in the protocol emulation definition file; and
   an interface including a display, configured by the protocol emulation definition, that displays data related to the session created by the emulation housing and facilitates the entry of commands and configuration data from a user, the commands and configuration data being transmitted to the emulation housing and modifying the behavior thereof; and
   an emulation controller that distributes protocol emulation definitions and acts as a conduit of data and commands between the emulation housing and the interface.

2. A protocol emulation system, as set forth in claim 1, wherein the emulation housing uses the protocol emulation definition file to construct a data structure storing data used during operation.

3. A protocol emulation system, as set forth in claim 1, wherein the interface uses the protocol emulation definition file to construct a reference model storing data used during operation.

4. A protocol emulation system, as set forth in claim 3, wherein the emulation housing uses the protocol emulation definition file to construct a reference model storing data used during operation.

5. A protocol emulation system, as set forth in claim 4, wherein the interface uses the reference model to instantiate messages for the emulation housing.

6. A protocol emulation system, as set forth in claim 4, wherein the emulation housing uses the reference model to instantiate messages for the interface.

7. A protocol emulation system, as set forth in claim 1, further comprising:
   a protocol state machine in communication with the emulation housing, the protocol state machine creating and responding to protocol messages.

8. A protocol emulation system, as set forth in claim 1, further comprising:
   scripts describing how to create and respond to protocol messages; and
   wherein the emulation housing passes received protocol message to the scripts and transmits responses generated by the scripts onto a network under test.

9. A protocol emulation system, as set forth in claim 1, wherein the interface comprises a graphical user interface that creates a display based on information contained in the protocol emulation definition.

10. A protocol emulation system, as set forth in claim 1, wherein the interface is textual.

11. A protocol emulation system, as set forth in claim 1, wherein the interface is created using a script language.

* * * * *